US011757965B2

(12) United States Patent
Pantos

(10) Patent No.: US 11,757,965 B2
(45) Date of Patent: Sep. 12, 2023

(54) LOW LATENCY STREAMING MEDIA

(71) Applicant: Apple Inc., Cupertino, CA (US)

(72) Inventor: Roger N. Pantos, Scotts Valley, CA (US)

(73) Assignee: APPLE INC., Cupertino, CA (US)

(*) Notice: Subject to any disclaimer, the term of this patent is extended or adjusted under 35 U.S.C. 154(b) by 0 days.

(21) Appl. No.: 16/776,824

(22) Filed: Jan. 30, 2020

(65) Prior Publication Data
US 2020/0267198 A1 Aug. 20, 2020

Related U.S. Application Data

(60) Provisional application No. 62/810,075, filed on Feb. 25, 2019, provisional application No. 62/807,329, filed on Feb. 19, 2019.

(51) Int. Cl.
H04L 65/75 (2022.01)
H04N 21/24 (2011.01)
(Continued)

(52) U.S. Cl.
CPC ............ *H04L 65/75* (2022.05); *H04L 65/612* (2022.05); *H04L 65/65* (2022.05); *H04L 65/70* (2022.05);
(Continued)

(58) Field of Classification Search
CPC . H04L 65/601; H04L 65/4084; H04L 65/607; H04L 65/608; H04L 65/75;
(Continued)

(56) References Cited

U.S. PATENT DOCUMENTS 8,156,089 B2 4/2012 Pantos et al.
8,650,192 B2 2/2014 Biderman et al.
(Continued)

FOREIGN PATENT DOCUMENTS

CN 102308547 A 1/2012
CN 102611701 A 7/2012
(Continued)

OTHER PUBLICATIONS

Office Action for Chinese Patent Application No. 202010100780.2, dated Sep. 22, 2021, 8 pages.
(Continued)

*Primary Examiner* — Mohamed A. Wasel
*Assistant Examiner* — Zonghua Du
(74) *Attorney, Agent, or Firm* — Womble Bond Dickinson (US) LLP

(57) ABSTRACT

Content streaming systems, such as systems that use HTTP compliant requests to obtain media segments for presentation of the content on a device. These content streaming systems can be optimized to reduce latency to a low level so that live events can be streamed to receiving devices in such a manner so that the time between an action in the live event and the presentation of the action on a receiving device that receives the streamed content is less than about 10 seconds. A client device can use rendition reports to tune-in to a new rendition (at a first bit rate) after presenting a prior rendition (of a second bit rate) when switching between the different bit rates; also, for example, a client device can use playlist annotations that indicate independent frames to avoid downloading depending frame media segments when switching between different renditions.

21 Claims, 14 Drawing Sheets

(51) Int. Cl.
  *H04N 21/462* (2011.01)
  *H04N 21/442* (2011.01)
  *H04N 21/2187* (2011.01)
  *H04N 21/262* (2011.01)
  *H04N 21/643* (2011.01)
  *H04L 65/65* (2022.01)
  *H04L 65/70* (2022.01)
  *H04L 65/612* (2022.01)

(52) U.S. Cl.
  CPC ..... *H04N 21/2187* (2013.01); *H04N 21/2402* (2013.01); *H04N 21/26258* (2013.01); *H04N 21/44209* (2013.01); *H04N 21/4621* (2013.01); *H04N 21/643* (2013.01)

(58) Field of Classification Search
  CPC ....... H04L 65/70; H04L 65/612; H04L 65/65; H04N 21/2187; H04N 21/2402; H04N 21/26258; H04N 21/44209; H04N 21/4621; H04N 21/643
  See application file for complete search history.

(56) References Cited

U.S. PATENT DOCUMENTS

| | | | | |
|---|---|---|---|---|
| 10,742,699 | B1* | 8/2020 | Shen | H04N 21/8456 |
| 2005/0038877 | A1* | 2/2005 | Gupta | G06F 16/4387 |
| | | | | 709/219 |
| 2008/0036917 | A1* | 2/2008 | Pascarella | H04N 21/235 |
| | | | | 725/42 |
| 2009/0150557 | A1* | 6/2009 | Wormley | H04L 47/10 |
| | | | | 709/231 |
| 2011/0246622 | A1 | 10/2011 | Pantos et al. | |
| 2012/0042050 | A1 | 2/2012 | Chen | |
| 2012/0263434 | A1 | 10/2012 | Wainner | |
| 2013/0054728 | A1 | 2/2013 | Amir | |
| 2014/0059244 | A1* | 2/2014 | Panje | H04N 21/26258 |
| | | | | 709/231 |
| 2014/0143439 | A1 | 5/2014 | Ramamurthy | |
| 2014/0156863 | A1* | 6/2014 | Gao | H04L 65/60 |
| | | | | 709/231 |
| 2014/0258463 | A1* | 9/2014 | Winterrowd | H04L 65/4092 |
| | | | | 709/219 |
| 2015/0067722 | A1 | 3/2015 | Bjordammen | |
| 2016/0119657 | A1* | 4/2016 | Sun | H04N 21/8456 |
| | | | | 725/94 |
| 2016/0248474 | A1* | 8/2016 | Gilson | H04N 19/164 |
| 2016/0373551 | A1* | 12/2016 | Karuppiah | H04L 67/02 |
| 2017/0195744 | A1 | 7/2017 | Engel et al. | |
| 2017/0289228 | A1 | 10/2017 | Romrell | |
| 2017/0359628 | A1* | 12/2017 | Sachdev | H04N 21/435 |
| 2017/0374320 | A1* | 12/2017 | May, Jr. | H04N 21/654 |
| 2018/0041561 | A1 | 2/2018 | Davies | |
| 2018/0255331 | A1 | 9/2018 | McLean | |
| 2020/0145701 | A1* | 5/2020 | Liu | H04N 21/2402 |
| 2020/0162796 | A1* | 5/2020 | Azuolas | H04N 21/23439 |
| 2020/0228588 | A1 | 7/2020 | Nielsen | |
| 2020/0267437 | A1 | 8/2020 | Pantos | |
| 2020/0344282 | A1* | 10/2020 | MacInnis | H04L 65/60 |
| 2021/0044639 | A1* | 2/2021 | Tielemans | H04N 19/172 |

FOREIGN PATENT DOCUMENTS

| | | |
|---|---|---|
| CN | 107148779 A | 9/2017 |
| CN | 108600784 A | 9/2018 |
| WO | 2010078281 A2 | 7/2010 |
| WO | 2011123821 A1 | 10/2011 |
| WO | 2018060489 A1 | 4/2018 |

OTHER PUBLICATIONS

Office Action for Chinese Patent Application No. 202010100779.X, dated Nov. 2, 2021, 13 pages.
First Search Document for Chinese Patent Application No. 202010100780.2, dated Sep. 14, 2021, 1 page.
First Search Document for Chinese Patent Application No. 202010100779.X, dated Oct. 25, 2021, 1 page.
Notification to Grant for Chinese Patent Application No. 202010100780.2 dated Mar. 9, 2022.
Supplementary Search for Chinese Patent Application No. 2020101007802 dated Feb. 28, 2022.
Second Office Action for Chinese Patent Application No. 202010100779.X, dated Apr. 25, 2022.
Notification to Grant for Chinese Patent Application No. 202010100779.X dated Sep. 5, 2022.

* cited by examiner

Playlist with media sequence numbers

EXT M3U
EXT-X-TARGETDURATION:2
EXT-X-MEDIA-SEQUENCE:43

EXTINF 1.996,
Segment 43.ts
EXTINF 1.996,
Segment 44.ts
EXTINF 1.996,
Segment 45.ts
EXTINF 1.996
Segment 46.ts

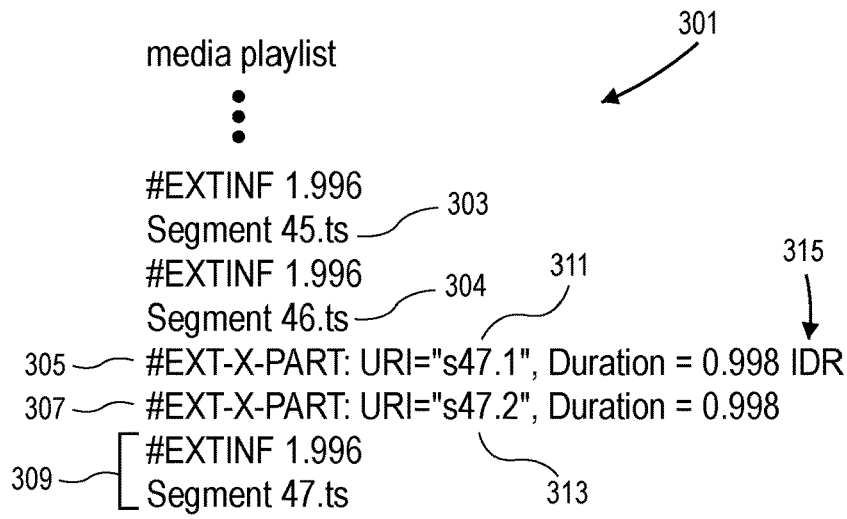

media playlist
...
EXTINF 1.996
Segment 45.ts — 303
EXTINF 1.996
Segment 46.ts — 304    311        315
305 — #EXT-X-PART: URI="s47.1", Duration = 0.998 IDR
307 — #EXT-X-PART: URI="s47.2", Duration = 0.998
309 — [ #EXTINF 1.996
       [ Segment 47.ts         313

FIG. 5B

Request for updated playlist
and future media segment

→ http://host.com/playlist.m3u8?msn=47&part=3&push=2
321        323                  325     357     329

FIG. 5C

RECEIVE A FIRST REQUEST FOR AN UPDATED PLAYLIST AND A FIRST UNIFORM RESOURCE IDENTIFIER (URI) IDENTIFYING AT LEAST A PORTION OF A MEDIA SEGMENT IN THE UPDATED PLAYLIST (FIRST REQUEST USES HTTP COMPLIANT REQUEST)
351

↓

DETERMINE, IN RESPONSE TO RECEIVING THE FIRST REQUEST, THAT THE UPDATED PLAYLIST IS NOT YET AVAILABLE AT THE ORIGIN SERVER
353

↓

BLOCK A COMPLETION OF A RESPONSE TO THE FIRST REQUEST WHILE THE UPDATED PLAYLIST IS NOT AVAILABLE
357

↓

TRANSMIT THE UPDATED PLAYLIST AND AT LEAST A PORTION OF THE REQUESTED MEDIA SEGMENT ONCE THE PLAYLIST BECOMES AVAILABLE
359

FIG. 6

CLIENT DEVICE REQUESTS, USING A PLAYLIST REQUEST ATTRIBUTE (E.G. REPORT = .../2M/index.m3u8), A RENDITION REPORT FOR ONE OR MORE OTHER RENDITIONS (WHILE PLAYING BACK A STREAM FROM A CURRENT RENDITION); FOR EXAMPLE, CLIENT MAY REQUEST A RENDITION REPORT FOR A HIGHER BITRATE RENDITION (HIGHER THAN THE CURRENT RENDITION) AND REQUEST A RENDITION REPORT FOR A LOWER BITRATE RENDITION (LOWER THAN THE CURRENT RENDITION)
701

SERVER, IN RESPONSE TO THE REQUEST FOR ONE OR MORE RENDITION REPORTS, TRANSMITS THE REQUESTED RENDITION REPORT(S) CONTAINING DATA (E.G., EXT-X-RENDITION-REPORT: LAST-MSN=7, LAST-PART=3) WHICH THE CLIENT DEVICE CAN USE TO TUNE-IN QUICKLY TO A DIFFERENT RENDITION'S NEAR LIVE POINT WHEN SWITCHING BITRATES (BETWEEN RENDITIONS)
703

FIG. 13

Playlist Annotations ⟵720

EXTM3U
EXT-X-TARGETDURATION:3
EXT-X-MEDIA-SEQUENCE:42
EXTINF 3.0,
segmetns42.ts ⎬ 721
EXTINF 3.0,
segment43.ts ⎬ 722
EXT-X-PART:URI="s44.1",DURATION=1.0,INDEPENDENT=YES ⟵ 723, 724
EXT-X-PART:URI="s44.2",DURATION=1.0 ⟵ 725
EXT-X-PART:URI="s44.3",DURATION=1.0 ⟵ 726
EXTINF 3.0,
segment44.ts ⎬ 727
EXT-X-PART:URI="s45.1",DURATION=1.0,INDEPENDENT=YES ⟵ 728, 729

FIG. 14

LOW LATENCY STREAMING MEDIA

This application claims the benefit of priority to prior U.S. Provisional Patent Application No. 62/807,329, filed Feb. 19, 2019 and to prior U.S. Provisional Patent Application No. 62/810,075, filed Feb. 25, 2019, both of which are incorporated herein by reference.

BACKGROUND

Many devices presently use streaming media content delivery systems to present content such as movies, television shows, recorded sports events, news programs, live events such as live sports events, live news events, etc. These streaming media content delivery systems typically use one or more playlists that enumerate an ordered series of uniform resource identifiers (URIs), such as uniform resource locators (URLs), to identify media segments that can be retrieved from one or more servers using conventional HTTP compliant requests. Once retrieved, the media segments can be presented on the client device that requested the media segments and then erased on the client device after the presentation of each of the media segments. These streaming media content delivery systems can display both recorded content, such as a movie or video on demand content or live content such as a live sports event or live news event that is happening at the same time that the user of a client device is watching the live sports event or live news event. The existing streaming content delivery systems include the DASH (Dynamic Adaptive Streaming over HTTP) based systems that are based on a standard (such as ISO/IEC 23009-1:2014) and systems from Apple Inc. based on Apple's HTTP live streaming (HLS) systems.

These existing systems can have difficulty delivering content for live events in a manner that has low latency relative to the live event. For example, for a live sports event that is happening while a user is viewing the live sports event using a streaming media system, an action that happened in the live event might not be displayed by the streaming media system until many seconds (e.g., 15 seconds or more) after the live event occurred (in real time). Many users may find this large latency disappointing, and thus there is a need to improve the latency of delivery in streaming media systems. This disclosure provides various solutions to solve this need.

SUMMARY OF THE DESCRIPTION

This disclosure describes various techniques, systems, non-transitory machine readable media, and methods for reducing latency or otherwise improving the delivery or processing of streaming media content. One aspect can use updated playlist requests, from a client device, that include, as part of the request for an updated playlist, a request for a (future) media segment in that updated playlist such as the first (in time) media segment in that updated playlist, and a server device can block a response to that request if the playlist containing that (future) media segment is not yet available, and when it is available the updated playlist is sent and the (future) media segment is pushed to the requesting client device. According to this aspect, the client device can be thought of as making a request for an expected playlist containing an expected next media segment before the expected playlist is available at the server, and the server can block a response to that request (while keeping the socket connection open) until the updated playlist is available. According to that aspect of this disclosure, a method for processing streaming media can include the following operations to request future media segments: receiving a first playlist in a transfer protocol compliant manner, such as HTTP/2, wherein the first playlist includes a plurality of uniform resource identifiers (URIs) which indicate an order of playback of multiple media segments that can be received to re-create a stream of content or data, and the first playlist can include a last URI in the order that identifies a last available media segment in the first playlist. The last URI precedes a URI for a request for at least a portion of a future media segment that was not available when the first playlist was created; the method further includes: transmitting, in a single request according to the transfer protocol, the URI for the at least a portion of the future media segment and a request for an updated playlist, wherein the updated playlist includes a second plurality of URIs for media segments for the stream of data; and receiving in response to the first request, the updated playlist and the future media segment that is responsive to the URI for the future media segment. Thus, the combined request for the updated playlist and the future media segment reduces the latency by eliminating separate requests that add round trip time(s) to the process. One aspect which uses future media segment requests can further include requesting a master playlist that includes a plurality of available media playlists and requesting, from the master playlist, the first playlist which is one of the plurality of available media requests. According to one aspect, the method can further include: upon receipt of the updated playlist, determining a last URI in the updated playlist for a last available media segment identified in the updated playlist and requesting, in a single HTTP compliant request, a further updated playlist and a media segment identified by a URI immediately after the last URI in the updated playlist prior to requesting all of the media segments identified in the updated playlist. In this aspect, a receiving device can skip over media segments in the further updated playlist to jump to or tune into a near current time in a live event identified by a last URI at the end of the playlist. In one aspect, the requesting of the further updated playlist and the media segment identified by the URI immediately after the last URI in the updated playlist can occur as a high priority process that is quickly scheduled in response to receipt of the updated playlist in order to quickly tune-in to a live event.

In one aspect, the URI for the future media segment can specify a starting position within the future media segment that did not exist when the first playlist was created, and the starting position can be between the beginning and the end of the future media select segment. In other words, the URI for the future media segment can specify a starting position within a media segment so that a response can avoid transmitting the portion of the media segment before the starting position. In one aspect, during a tune-in phase for acquiring a live streaming content, the client device can repeatedly skip to each of a next URI in a next playlist to seek to a latest playback time in the live streaming content. Successive playlist updates through a series of rapidly requested updates for a playlist can be used to differentiate between older playlists that are cached (e.g., in a CDN) and a near live point updated playlist that is the process of being completed at the origin server so the response is blocked and delayed. The differentiation can be based on a response time that indicates the longer delay is for the most recent updated playlist. According to one aspect, the live event can be an event that is happening at the same time that a user of the client device is watching or otherwise consuming the event. According to one aspect, the multiple media segments identified by the URIs in the playlists are each less than about 5 to 10 seconds in length. According to one aspect, the last URI in the first playlist can include a first tag for a media sequence number and a second tag for a part number specifying a starting position within the media segment identified by the last URI. According to one aspect, a socket connection can be maintained in an open state after requesting the updated playlist so that the updated playlist and the at least a portion of the future media segment are received through the socket connection which was maintained in the open state.

According to another aspect of this disclosure, a method for processing streaming media can include the following operations performed by a server system in response to receiving a future media segment request: receiving a first request for an updated playlist identified by a first uniform resource identifier (URI) and the first request also requesting at least a portion of a media segment in the updated playlist, the first request received as a single transfer protocol compliant request that requests both the updated playlist and the media segment in the updated playlist; determining, in response to receiving the first request, that the updated playlist is not yet available; blocking a completion of a response to the first request for the updated playlist while the updated playlist is not yet available; and transmitting, in response to the first request, the updated playlist and at least a portion of the first media segment once the updated playlist becomes available. The first media segment can be the first media segment in an order of media segments in the updated playlist that identify multiple media segments and the order specifies an order of playback of the multiple media segments that are retrievable using the updated playlist. The URI requesting the updated playlist contains information that allows a server to determine which media segment (or portion of a media segment) it must wait for. According to one aspect, a socket connection, established by the first request can be kept open while the completion of the response is blocked and while the updated playlist and the portion of the first media segment is transmitted. According to one aspect, the updated playlist and the at least a portion of the first media segment are transmitted as part of a single response to the first request. According to one aspect the method can further include the operations of: receiving a request for a master playlist and transmitting the master playlist; and receiving a request for a media playlist selected from a set of media playlists identified in the master playlist, wherein the selected media playlist is at least partially processed by a remote client device before the first request is received. According to one aspect, a data processing system which performs this method can be a set of one or more origins servers that complete the creation of the updated playlist to thereby make the updated playlist available for transmission to one or more client devices after receiving the first request. According to one aspect, the method can further include the operations of: receiving, in the first request, a push tag that specifies a number of media segments or portions of one or more media segments, to be transmitted ("pushed") as part of the response to the first request from a server to a client, wherein the pushing of the number of media segments allow a client device that sent the first request to avoid transmitting multiple requests for the number of media segments. According to one aspect, at least one of the master playlist or a media playlist can specify that the data processing system, such as the one or more origins servers, can support requests for future media segments to provide a low latency streaming service. According to one aspect, the first URI can comprise a first tag for a media sequence number and a second tag for a part number specifying a position within the media segment identified by the first URI. According to another aspect, the media sequence number may not be part of the URI but is determined based on a media sequence tag at the top of the current playlist and the number of intervening media segments before the last media segment.

According to another aspect described in this disclosure, a method can include the following operations for processing streaming media by making multiple concurrent requests for media segments: transmitting a first request for a media playlist, the media playlist including a plurality of URIs that indicate an order of playback of multiple media segments in a transfer protocol compliant manner to re-create a stream of data; receiving, in response to the first request, the media playlist and selecting two consecutive media segments specified by two consecutive URIs in the received media playlist; transmitting a second request, as one or more transfer protocol compliant requests (such as a single HTTP/2 request or two consecutive requests), for the two consecutive media segments, and the second request specifying a download dependency between the two consecutive media segments (to cause a server to send the first of the two before sending the second of the two); receiving, in response to the second request, the first media segment of the two consecutive media segments; determining if a download of the first media segment has completed; and transmitting, in response to determining the download of the first media segment has been completed, a third request for a next media segment that immediately follows a second media segment of the two consecutive media segments, the third request occurring while the second media segment is being downloaded. The second request can specify the download dependency using the HTTP/2 protocol so that the first media segment is completely sent by the server before the server begins to send the second media segment. According to one aspect, the media playlist can be selected from a requested and received master playlist that specifies a set of renditions of the streaming content. According to one aspect, the media playlist can be an updated playlist and the stream of content is for a live event. According to one aspect of this disclosure, the method can further include: determining whether to cease sending a request for a subsequent media segment while a prior media segment is downloading. A data processing system can determine to temporarily cease sending such requests based on how many media segments exist in an updated playlist before a near live media segment (at the end of the playlist) having a low latency relative to a live event; this data processing system may do this because it has enough buffered data already and does not want to use more resources to buffer more media segments or because there are no more media segments left to request at the end of the playlist. In one aspect, the low latency is based on a threshold value and the client device is configured to attempt to achieve a low latency of presentation of the streaming content relative to a live event.

Another aspect of this disclosure relates to control of buffer bloat in buffers in the connection medium (e.g. wired and/or wireless network(s)) between a client device and a set of one or more servers such as origins servers or content distribution network servers. This control of buffer bloat can be used in a streaming media content delivery system which also attempts to achieve a low latency for live events which are presented through the streaming media. According to this aspect, a method can include the following operations: measuring a round-trip time of a connection between a data processing system such as a client device and a server system, where the connection is used as part of an HTTP compliant transmission of streaming media to the client device; determining a send window size based on a calculated bandwidth delay product; and transmitting data about the send window size to the server system. In one aspect, the data about the send window size is used to throttle throughput while maintaining sufficient throughput to present a current rendition of the streaming media. According to one aspect, the method can further include the operation of determining a minimum bit rate for supporting playback of the current rendition of the streaming media. According to one aspect, the minimum bit rate can be selected to avoid stalling of playback of the current rendition. According to one aspect, the send window size is determined so that the connection can sustain the minimum bit rate for the measured round-trip time. According to one aspect, the method can further include the operation of: monitoring the round-trip time (RTT) for the connection to detect a persistent change (over a threshold value) in the round-trip time for a period of time. According to one aspect, when the round-trip time persistently changes over the threshold value, the client device can determine a new send window size and transmit that new send window size to one or more server systems. According to one aspect, requests for updated playlists and requests for media segments identified by URIs in the updated playlists are transmitted from the client device through the connection and the media segments are received by the client device through the connection. According to one aspect, a request for an updated playlist can also include, as part of a single HTTP compliant request, a request for a first media segment in the updated playlist. According to one aspect, the client system can attempt to reduce latency to a low latency for a live event that is presented in the streaming media such that a difference in time between an action in the live event and a presentation of the action in the streaming media on the client device is less than about 3 to 6 seconds. According to one aspect, the round-trip time can be measured by examining timing data for packets used to open a TCP connection or by using a mandatory ping feature that is included in the HTTP/2 protocol and can be used to measure RTT.

One or more server systems can also perform methods to attempt to control buffer bloat, and such methods can include the following operations: receiving data about a send window size for use in sending streaming media to a client device which had determined the send window size based on a calculated bandwidth delay product after the client device measured a round-trip time for a connection for the streaming media between the client device and the data processing system such as one or more servers; and throttling an HTTP compliant transmission of the streaming media based on the send window size. In one aspect, the client device can determine the send window size so that the connection can sustain a minimum bit rate required for a current rendition of the streaming media that the client device is presenting and the minimum bit rate can be selected to avoid stalling of playback of the current rendition. The connection between the client device and the one or more server systems can be used to receive requests for updated playlists and receive requests for future media segments identified by URIs, and the connection can be used to transmit the updated playlists and to transmit the requested media segments. According to one aspect, a server system can attempt to throttle transmissions to the client device to limit buffer congestion in the connection while also attempting to reduce latency to a low latency for a live event that is presented in the streaming media on the client device such that a difference in time between an action in the live event and a presentation of the action in the streaming media on the client device is less than about 3 to 6 seconds.

Certain aspects described in this disclosure relate to switching between renditions such as different bit rate renditions of the streaming media. These various aspects can also be used to improve latency to reduce latency to a low desirable value. According to one aspect which involves switching between renditions, a client device can perform the following operations: monitoring a bandwidth of a connection used for receiving a first rendition of a streaming media provided through an HTTP compliant protocol; determining whether to switch to a second rendition of the streaming media based on the monitored bandwidth; requesting a first playlist for the second rendition in response to determining to switch to the second rendition; requesting, after requesting the first playlist, a first plurality of media segments of the first rendition; and requesting a second plurality of media segments of the second rendition. According to one aspect, this method can be used to download both renditions concurrently to the client device after deciding to switch from the first rendition to the second rendition and while the client device attempts to switch between the two renditions. In one aspect, the requesting of the first plurality of media segments can specify a first weight for a relative download priority for the first plurality of media segments, and wherein the requesting of the second plurality of media segments also specifies a weight which is a second weight for a relative download priority for the second plurality of media segments, wherein the first weight and the second weight are different. According to one aspect, the first weight is greater than the second weight when the first rendition has a lower bit rate than the second rendition such that downloading favors the first rendition (the lower bit rate rendition) over the second rendition. According to one aspect, the second weight is greater than the first weight when the second rendition has a lower bit rate than the first rendition such that downloading favors the second rendition over the first rendition, and more media segments of the second rendition are downloaded, over a period of time, then media segments of the first rendition. According to one aspect, this method can further include the operation of: requesting a set of one or more rendition reports about one or more corresponding renditions, wherein each rendition report in the set of rendition reports provides data about a recently updated playlist for a corresponding rendition to facilitate a quick tune-in to a near live point in the corresponding rendition, and the set of renditions include one or more of (1) a rendition report for a lower bit rate rendition that has a lower bit rate than the first rendition and (2) a rendition report for a higher bit rate rendition that has a higher bit rate than the first rendition. The requested one or more rendition reports can be bundled with the playlist response sent by the server and therefore can be at least as up-to-date as the updated playlist itself or can be sent separately. According to one aspect, the client device can skip over media segments within the updated playlist to jump to the next media segment following the last media segment in the updated playlist in order to facilitate a quick tune-in to the near live point in the streaming content. Once the client device has tuned in to the near live point in the streaming content, the client device can attempt to maintain a low latency for a live event such that a difference in time between an action in the live event and a presentation of the action in the streaming media on the client device is less than about 3 to 6 seconds or less than about 15 seconds.

Certain aspects of this description relate to the use of rendition reports by a client device to allow a quicker tune-in to near live points in streaming media. According to one aspect a client device can use rendition reports by performing a method which can include the following operations: monitoring a bandwidth of a connection used for receiving a first rendition of a streaming media provided through an HTTP compliant protocol; determining whether to switch to a second rendition of the streaming media based on the monitored bandwidth; requesting a set of one or more rendition reports about the one or more corresponding renditions; and requesting a first playlist for the second rendition in response to determining to switch to the second rendition. In one aspect, each rendition report in the set of one or more rendition reports provides data about a recently updated playlist for a corresponding rendition to facilitate a quick tune-in to a near live point in the corresponding rendition, and the set of one or more rendition reports includes one or more of (1) a rendition report for a lower bit rate rendition that has a lower bit rate than the first rendition and (2) a rendition report for a higher bit rate rendition that has a higher bit rate than the first rendition. According to one aspect, the recently updated playlist can include a plurality of URIs and wherein a last URI in the plurality of URIs is a near live point relative to a live event that the data processing system can skip to facilitate the quick tune-in, and wherein a skip to the last URI can avoid downloading media segments before the last URI. In one aspect, the requests for updated playlist and the request for media segments identified by the URIs in updated playlists are transmitted through a connection with the server, and wherein a request for an updated playlist also includes, as part of a single HTTP to compliant request, a request for a first media segment in the updated playlist. According to one aspect, the client device can attempt to reduce latency to a low latency value for a live event that is presented in the streaming media such that a difference in time between an action in the live event and a presentation of the action in the streaming media on the client device is less than about 3 to 6 seconds or less than about 15 seconds.

Another aspect described in this disclosure relates to the use of playlist annotations to of avoid loading unusable dependent frames before independent frames when switching between renditions. According to this aspect, a client device can perform a method which includes the following operations: monitoring a bandwidth of a connection used for receiving a first rendition of a streaming media provided through an HTTP compliant protocol; determining whether to switch to a second rendition of the streaming media based on the monitored bandwidth; requesting a first playlist for the second rendition in response to determining to switch to the second rendition; examining, in the first playlist, one or more playlist annotations that specify whether a media segment includes an independent frame that can be decoded into a full image frame without using any prior frames; skipping a download of at least portions of one or more media segments, in the first playlist, that do not include an independent frame based on the one or more playlist annotations; beginning download of media segments in the second rendition with a media segment that includes an independent frame based on the one or more playlist annotations. According to one aspect, the first playlist includes dependent frames that cannot be decoded into valid image data without a prior independent frame. An independent frame is a keyframe that contains all necessary data to derive and decode an encoded image in the keyframe, and dependent frames that follow in time the independent frame use data in the keyframe to decode encoded images in the dependent frames. According to one aspect, the dependent frames can include B and P frames that include difference data relative to an independent frame on which they depend. According to one aspect, a method which uses playlist annotations can also use rendition reports as described herein.

The aspects and embodiments described herein can include non-transitory machine readable media that store executable computer program instructions that can cause one or more data processing systems (such as client devices and one or more server systems) to perform the one or more methods described herein when the computer program instructions are executed by the one or more data processing systems. The instructions can be stored in nonvolatile memory such as flash memory or dynamic random access memory or other forms of memory.

The above summary does not include an exhaustive list of all aspects and embodiments in this disclosure. All systems and methods can be practiced from all suitable combinations of the various aspects and embodiments summarized above and also those disclosed in the Detailed Description below.

BRIEF DESCRIPTION OF THE DRAWINGS

The aspects described herein are illustrated by way of example and not by limitation, in the figures of the accompanying drawings in which like reference numerals refer to similar elements.

FIG. 5B shows an example of a media playlist which can include part identifiers and playlist annotations.

FIG. 5C shows an example of a request for an updated playlist in combination with a request for a future media segment.

FIG. 6 is a flowchart which illustrates an aspect described herein which can be performed by a server system upon receipt of a future media segment request concurrently with receipt of a request for an updated playlist.

FIG. 13 is a flowchart which illustrates one aspect for switching between renditions.

FIG. 14 shows an example of a playlist which includes annotations, such as playlist annotations that can be used when switching between renditions.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one aspect" or "one embodiment" or "an embodiment" or "an aspect" means that a particular feature, structure, or characteristic described in conjunction with the aspect or embodiment can be included in at least one aspect or one embodiment. The appearances of the phrase "in one embodiment" or "in one aspect" in various places in the specification do not necessarily all refer to the same embodiment or same aspect. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1A:
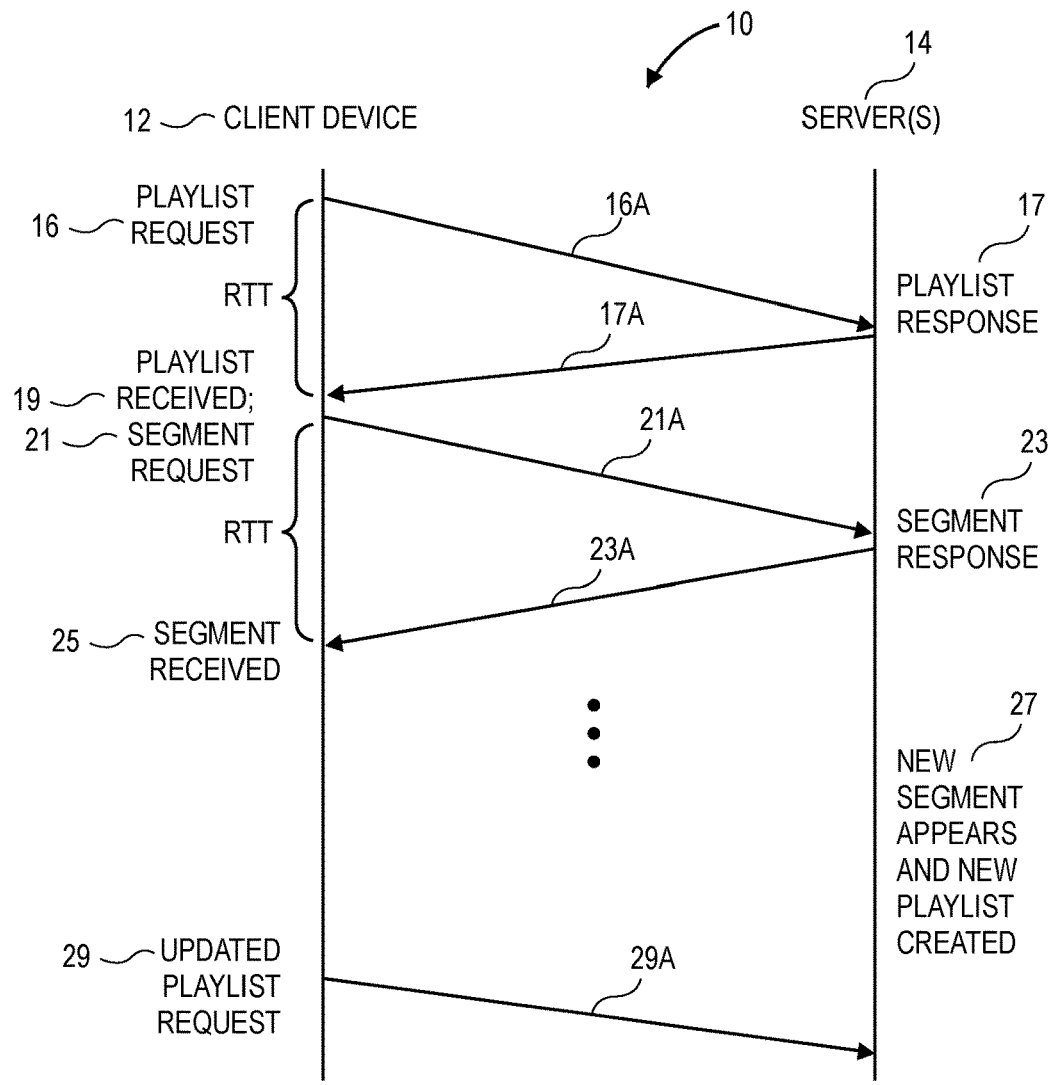
FIG. 1A shows an example from the prior art in which a client device communicates with a server device to request streaming media and receive streaming media from the server device.

FIG. 1A shows the interaction, over time, between a client device and a server device in a prior art streaming media content delivery system. A client device 12 requests media playlists and requests media segments identified in the media playlists, and a server device 14 responds to the requests, received through connection medium 10, by transmitting the requested playlist and by transmitting the requested media segments through the connection medium 10. As shown in FIG. 1A, a playlist request 16 is transmitted 16A through connection medium 10 to the server device 14 which responds with a playlist response 17. The playlist response 17 is transmitted 17A through connection medium 10 and is received 19 by the client device 12 sometime after the playlist response 17 began its transmission. Then the client device 12 can examine the playlist and request 21 a media segment and cause the transmission 21A to the server device. The server device then responds with segment response 23 causing the transmission 23A of the media segment response which is received by the client device as indicated by media segment 25 being received at the client device. This can continue until a new segment appears 27 and an updated playlist is created which contains the new segment. The client device 12 requests, after the updated playlist has been created, an updated playlist 29 and transmits this updated playlist request through transmission 29A to the server device. The process repeats after the client device 12 receives the updated playlist and examines the updated playlist and requests media segments, one at a time, from the updated playlist. Further information about this process can be found in U.S. Pat. No. 8,650,192.

Figure 1B:
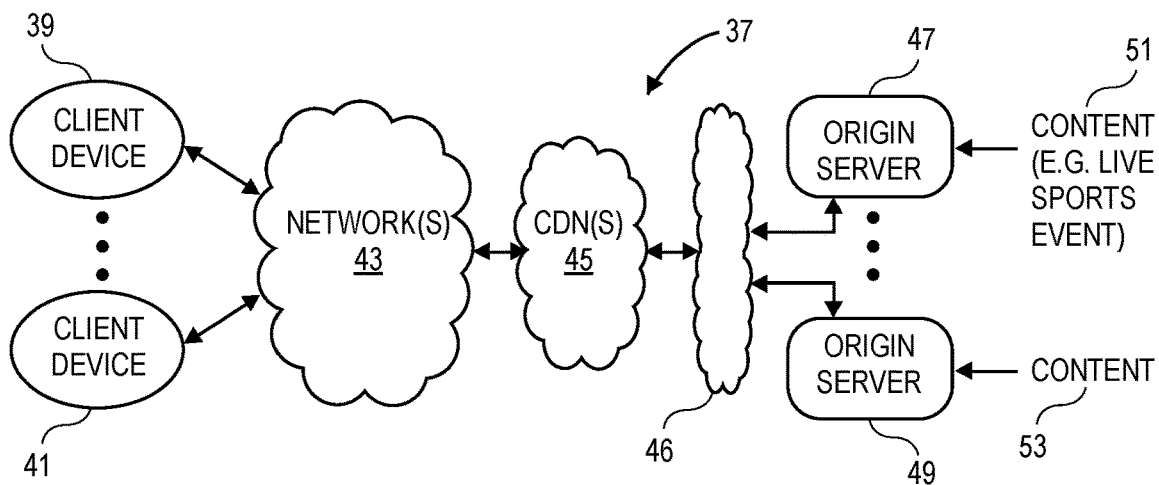
FIG. 1B shows an example of a content delivery system which can include one or more client devices and one or more origin servers which communicate through a connection medium such as one or more networks which can include one or more content distribution networks.

FIG. 1B shows an example of a content delivery system 37 which can be used in the one or more aspects described herein. The content delivery system 37 can include one or more client devices such as client device 39 and client device 41 which are coupled to one or more networks 43 (such as, for example, the Internet) which in turn can be coupled to one or more content distribution networks 45 which in one implementation can be optional. The one or more content distribution networks 45 can be coupled in turn to one or more origin servers, such as origin server 47 and origin server 49 through one or more networks such as networks 49 which can be part of the one or more networks 43. The one or more networks 43 and one or more networks 46 can be part of the Internet or can be part of proprietary networks, or can be a combination of the Internet and proprietary networks etc. The one or more origin servers, such as origin server 47 and origin server 49 can be coupled to sources of content, such as content 51 and content 53. The content can include live content such as live sports events or live news events, etc. in addition to previously recorded (not live) content such as movies, TV shows and other content. The content can be divided up into media segments and the media segments can be stored by the one or more origin servers and the one or more origin servers can create media playlists containing identifiers, such as URIs, that refer to the media segments. The various client devices and server systems described herein can be one of the systems shown in FIG. 1B.

Figure 2:
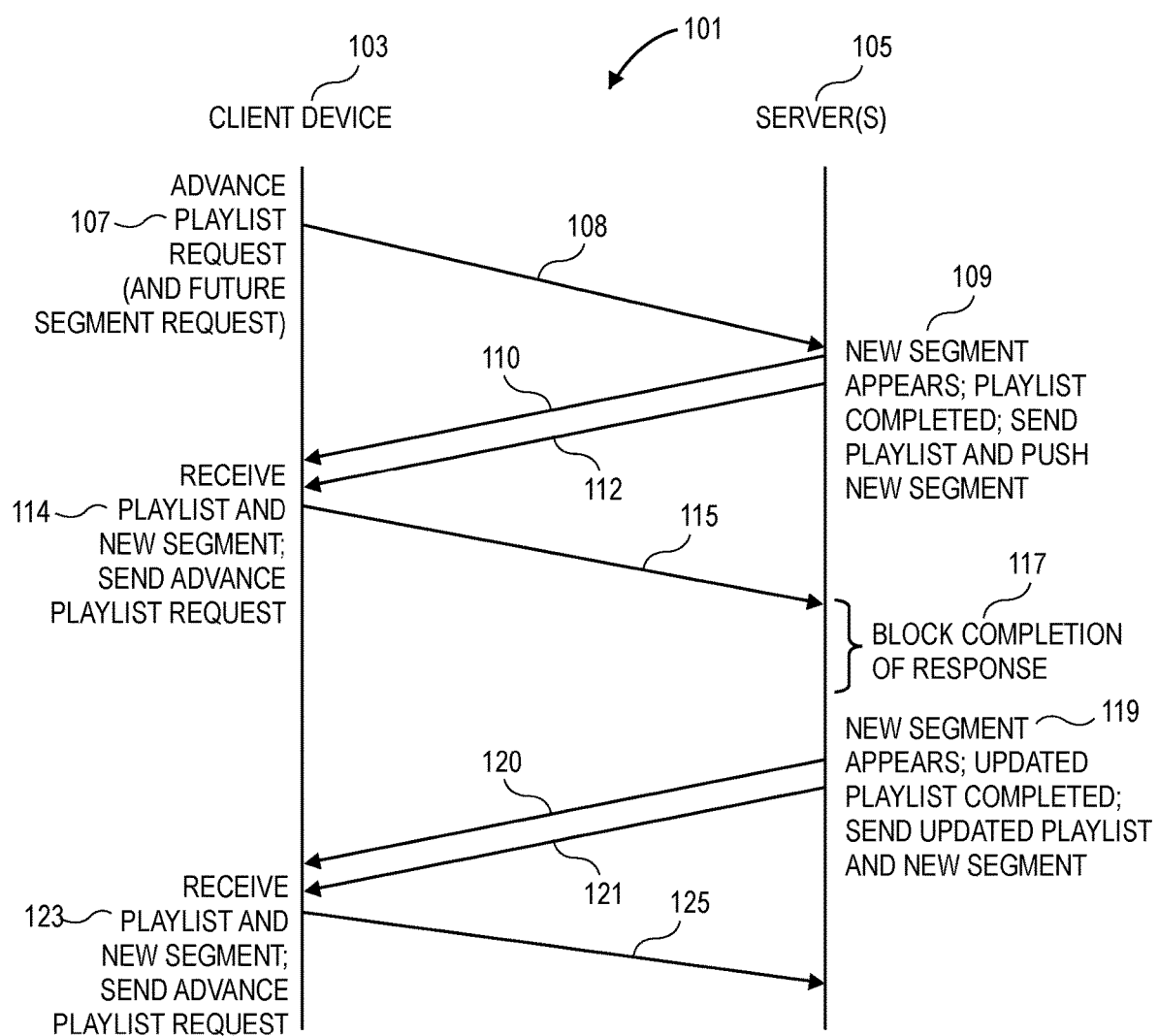
FIG. 2 shows an example according to one aspect in which a client device can make a playlist request with a future media segment request and the server device can block completion of a response until the future segment request is available and the updated playlist can then be completed.

This disclosure presents various different aspects which can be used either by themselves or in combination to reduce latency in or process data in streaming media content delivery systems when these systems are used for live events, such as live sports events and live news events, etc. One such aspect includes the use of future media segment requests, and FIGS. 2, 3, 4, and 5A show examples of how client devices can request future media segment requests in order to reduce latency when live streaming media content is being received. FIG. 2 shows an example of an aspect in which a client device, such as client device 103, makes an advance playlist request for the next update to the playlist and also makes a request, as part of the advance playlist request, for a future media segment which is expected to be in the next updated playlist. In particular, as shown in FIG. 2, the client device 103 can make a playlist request 107 for an updated playlist and at the same time (as part of the playlist request 107) also request a future media segment that is expected to be in the updated playlist, and this request is transmitted 108 to one or more server systems or devices 105 through a connection medium 101 (such as one or more networks 43 and/or 46). When the new segment appears 109, the one or more server systems or devices 105 can complete the playlist and then send the playlist to the client device. The one or more server systems or devices 105 can also push the new segment which was the future media segment requested by the client device in the request 107. The one or more server systems 105 can block a completion of a response until the new segment 109 appears and the updated playlist is completed. Transmissions 110 and 112 can include transmissions of the updated playlist as well as the new segment, and the client device 103 receives 114 the updated playlist and the new segment. Upon receipt (114) of the updated playlist, the client device 103 can again send a playlist request for the next updated playlist which may not be available. This request is transmitted as transmission 115 and received by the one or more servers 105. A corresponding socket connection can be established by the playlist request in the transmission 115. This may cause the one or more servers 105 to block completion 117 of a response and also keep the previously established socket connection open. Once the new segment appears 119, the one or more servers 105 can complete the creation of the updated playlist and send the updated playlist and the new segment in transmissions 120 and 121 as shown in FIG. 2. The client device 103 can then receive (receipt 123) this updated playlist and the new segment and again send (in response to receipt 123) another advance playlist request in transmission 125.

In conventional systems, a future media segment would be a media segment in the next playlist that is updated to include new segments, and the future media segment would not be available when the currently used playlist was created. In contrast, as shown in the example of FIG. 2, the client device 103 can make an update playlist request and also at the same time and as part of the same request also request a future media segment which future media segment was not available when the currently used playlist was created. Thus the method shown in FIG. 2 can eliminate at least one round-trip time relative to the example shown in FIG. 1A. Also as shown in the example of FIG. 2, the client device can be configured to make a request for the next updated playlist immediately upon receipt of a current updated playlist so that the client device is asking for the next updated playlist upon receipt of a current updated playlist.

How a client device processes a newly received updated playlist can depend upon whether the client device is tuning into the streaming content for a live event (a tune-in phase) or the client device has acquired ("tuned-in") to a near live point after the tune-in phase. During the tune-in phase, no media segments may be downloaded to the client device, and the client device can do this by requesting the future media segment with a push=0 tag (which is explained further below). As a result, the future media segment is not pushed or downloaded to the client device but the client device still uses the future media segment request to jump ahead (by acquiring more recent updates to the playlist), during the tune-in phase, to a near live point. After the tune-in phase, the client device processes media segments identified in the playlist by requesting them, receiving them and presenting them. A client device can determine to enter the tune-in phase when an initial playlist (e.g., a master playlist) is first selected. This usually happens when a user of the client device selects content to watch (e.g. selection of a live event such as a live sports event) before any of the content has been received. The tune-in phase is designed to discover the most current playlist instead of an out-of-date playlist that is cached in, for example, a content distribution network (CDN). A client device can decide to exit the tune-in phase after determining that a most recently received updated playlist has only a few new media segments (e.g. less than 3) prior to a last media segment in the updated playlist. As a client device approaches a near live point during a tune-in phase, there should be fewer new media segments in successive updated media playlists, and the client device can switch out of the tune-in phase and begin to retrieve and present media segments when the number of new media segments is below a threshold value. Alternatively, a client device can switch out of the tune-in phase after spending a predetermined period of time in the tune-in phase. Another alternative is to exit the tune-in phase after determining that the time taken to obtain a new updated playlist exceeds a threshold value which suggests that the delivery infrastructure had to block a response to await the production of a new segment.

Figures 3, 4:
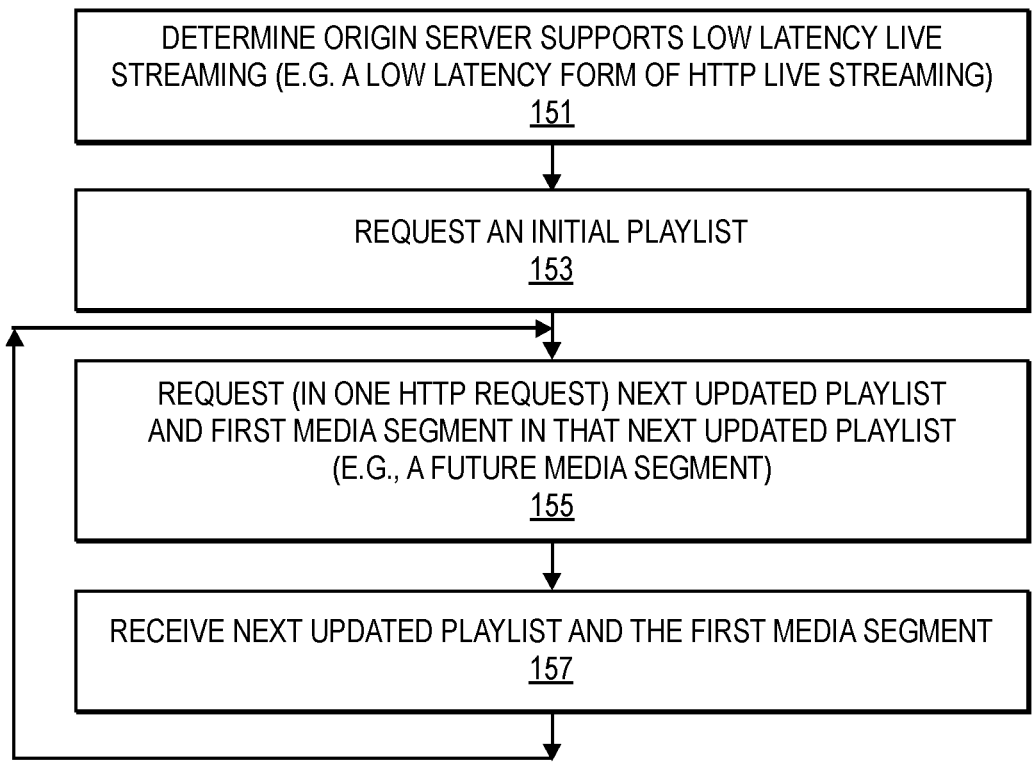
FIG. 3 is a flowchart which illustrates one aspect described herein.
FIG. 4 shows an example of a playlist according to one aspect described herein.

FIG. 3 shows an example of a method which can be performed to request future media segments, and the method shown in FIG. 3 can be implemented by the client device 103 in FIG. 2. A method for requesting future media segments can begin in operation 151 of FIG. 3 by determining that an origin server supports low latency live streaming, such as a low latency form of HTTP live streaming ("HLS"). A client device can determine such support by reading a tag in, for example, a master playlist (or alternatively a media playlist) received either directly or indirectly from the origin server. For example, the master playlist or a media playlist can signal such support by a tag which states "supports blocking reload" according to one aspect (or the tag can state: "supports low latency streaming"). According to one aspect, when a client device determines that the one or more server systems can support low latency mode, the client device can enable low latency mode and employ one or more of the aspects described in this disclosure.

In one aspect of this disclosure, a client device may only enable low latency mode when a server system indicates support, and this can allow the server systems to control which content is allowed to use low latency mode. In effect, the server systems can ration low latency mode and allow it to be used for live streaming events and disallow its use for streaming content that is not live such as previously recorded content (e.g. movies, TV shows, etc.). Referring back to FIG. 3, in operation 153, the client device can request an initial playlist such as an initial media playlist. Then in operation 155 the client can request, in one HTTP request, a next updated playlist and a media segment in that next updated playlist which can be a future media segment. Then, as shown in operation 157, upon receipt of the next updated playlist and the first media segment the client device can immediately loop back to operation 155 to request the next updated playlist and a media segment in that next updated playlist. By repeating operations 155 and 157, the client device can quickly tune into a live streaming event (during a tune-in phase) by jumping or skipping through a series of one or more updated playlists (without downloading any media segments in each of the one or more updated playlists in the series) to arrive at the near live point (having a low latency) of the live event. Moreover, after the tune-in phase, the client device can maintain a low latency at a near live point of the live event by repeating operations 155 and 157. Depending on the latency of the network connection, this may mean a latency as small as one or two seconds or a latency as large as 3 to 6 seconds depending upon the network connection and other factors. A latency of 2 seconds means that a client device presents an action in a live event (e.g. scoring of a goal in a soccer game) on the client device 2 seconds after the action occurred in the live event that is being presented through a streaming media content delivery system that includes the client device.

FIG. 4 shows an example of a playlist 175 which includes media segments, such as the media segment 177 which is the last media segment of the playlist 175 as shown in FIG. 4. When a client device receives playlist 175 it can examine the playlist and determine which media segment is the last media segment in the playlist and can then determine a future media segment by deriving an identifier for the future media segment based upon an identifier for the last segment, such as the media sequence number=46 for last segment 177. For example, the client device can employ a known predetermined numbering convention that can be used to derive a next media sequence number for a future media segment from a last media sequence number in the current playlist. In the example shown in FIG. 4, the media segments are identified with media segment numbers which are further explained below and which can be used to derive a future media segment. As used herein, a "future media segment" is a media segment that is expected to be in the next updated playlist available from the one or more servers providing the streaming media content. In the example shown in FIG. 4, the known numbering convention can be the use of integers in a known sequence, where the integer for the last media sequence number in the playlist is incremented by one (1) to derive the media sequence number for the next media segment in the next playlist. It will be appreciated that alternative numbering conventions can be used to use numbers to identify media segments and to derive future media segment identifiers such as a media segment number for a future media segment. A client device can, after receiving the next playlist and its first media segment, skip to the next media segment after the first media segment if the first media segment is in the next playlist; the media sequence tag is increased by 1 to keep the identification of segments by msn consistent as a result of this skip.

Figure 5A:
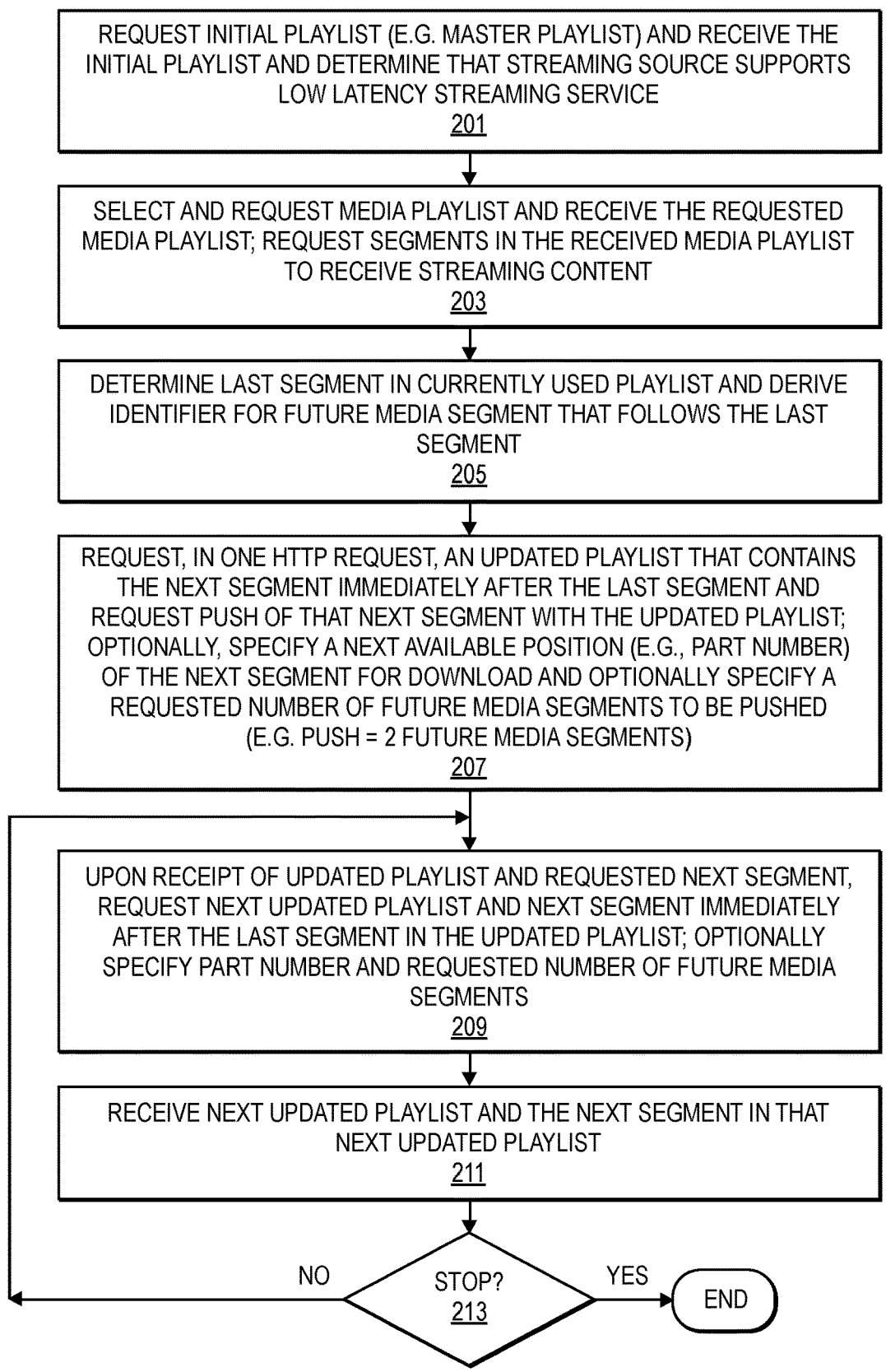
FIG. 5A is a flowchart which illustrates one aspect described herein in which future media segments can be requested concurrently with a request for an updated playlist.

FIG. 5A shows an example of a method which can be performed by a client device, such as the client device 103, to provide low latency receipt of live streaming media content through the use of concurrent updated playlist requests which also include a request for a future media segment. The method shown in FIG. 5A can begin in operation 201. In operation 201, a client device can request an initial playlist such as a master playlist and receive that initial playlist and then determine, from for example the initial playlist, that the streaming source can support low latency streaming through a low latency streaming service. This determination may be made by detecting a tag which indicates such support in the initial playlist. Then in operation 203 the client device can select and request a particular media playlist identified in the initial playlist. The client device can receive that requested media playlist and begin to request media segments in the received media playlist to begin to receive streaming content. In operation 205, the client device can determine the last media segment in the currently used media playlist and derive an identifier for a future media segment that follows that last segment in the currently used media playlist. In one aspect, the client device may use a numbering convention to derive the identifier for the future media segment. For example, if the last segment in the current playlist is identified by a media sequence number 46 then the next media sequence number is 47 and the request for the future media segment can use the media segment number 47 as an identifier for that future media segment. Then in operation 207, the client device can request, in one HTTP request, a push of the future media segment and an updated playlist that contains the next media segment specified by the identifier for the future media segment in operation 205. This next segment, according to one aspect, immediately follows the last segment in the currently used playlist referred to in operation 205. Thus, the client device makes a single request containing both the request for the updated playlist and a media segment (next media segment) contained in that updated playlist and also requests a push of that next media segment with transmission of the updated playlist. In certain aspects, the request can optionally specify a next available position, such as by a part number, of the next segment for download and can optionally specify (e.g. through a push tag) a requested number of future media segments to be pushed. For example, the request which includes a request for the updated playlist and a next segment contained in that updated playlists can also specify a part number and a push number which specifies the number of future media segments to be pushed. This is described further below relative to FIG. 5C. Following operation 207, in operation 209 the client device can receive the updated playlist and the requested next segment and immediately upon receipt of both of these can then request the next updated playlist and the next segment (contained in that next updated playlist). After receiving the next updated playlist and the next segment (contained in that next updated playlist) in operation 211, the system can determine whether or not streaming is to be stopped in operation 213. If it is not to be stopped, then processing returns back to operation 209, and operations 209 and 211 can continue while the streaming content is being received by the client device. In one aspect, this request in operation 209 can be made by a request that is scheduled as a high priority process by a scheduling mechanism of an operating system of the client device, and the scheduling can occur in response to receipt of the updated playlist.

This method shown in FIG. 5A can allow a client device to quickly tune-in to a live event or to also stay current with a live streaming event after a tune in phase. For example, during a tune-in phase a client device can skip over (without downloading) a plurality of media segments in a playlist to jump to or skip to the last media segment in the current media playlist. The client device can use an identifier of that last media segment to derive an identifier for a next media segment (that follow the last media segment) contained in a next playlist. According to one implementation, this could occur without downloading any media segments within a particular playlist as a client device attempts to quickly tune into a live streaming event. Even after the tune in phase for a client device, a client device can continue to process playlists in this manner shown in operations 209 and 211 by requesting the next playlist and a future media segment (in that next playlist) upon receipt of an updated playlist while continuing to process the currently used playlist. After the tune in phase, the client device would process media segments within each received playlist (by downloading those media segments and presenting those media segments) but would also request the next playlist and the media segment contained in that next playlist upon receipt of the currently used media playlist. In this manner, the client device, after the tune-in phase, can stay current with the live streaming content by continually requesting a next updated playlist along with a particular media sequence number expected to be in the next playlist while also retrieving and presenting media segments in the currently used playlist.

FIG. 5B shows an example of a media playlist 301 which includes a plurality of media segment identifiers including for example media segment identifiers 303, 304, 305, 307, and 309. In the example shown in FIG. 5B, part identifiers are also provided for one of the media segments (the media segment identified by the media sequence number 47). In this example, the media segment 47 can be retrieved in parts, and one of those parts includes an independent frame indicated by the annotation 315; the use of these annotations is described further below. Part identifier 311 allows a client device to retrieve part one and part identifier 313 allows a client device to specify retrieval of the second part of the two parts of the media segment identified by legacy media segment identifier 309. In addition to the media segment identifiers 305 and 307, the media segment identifier 309 also can be used by a client device such as a legacy client device (which may not be able to retrieve media segments in parts) to retrieve the entire media segment rather than just a portion of the media segment. In one aspect, it may be desirable to break out a media segment into parts for only the last set of media segments in an updated playlist so that a client device that is near the live point of a live event and which has already requested earlier parts of a particular media segment can jump to a later part of the particular media segment. For example, for a client device that has a latency of less than 4 seconds relative to the live event, the client device may have already requested most of the media segments in an updated playlist except for the last few media segments at the updated playlist, and so the list by parts in the last few media segments allows the client device to be selective about retrieving segments at the part level (rather than an entire segment). Referring to FIG. 5B, in this example, the client device receives updated playlist 301 but has already requested part 47.1 (part identifier 311) as a result of a prior request for a future media segment, and so the client device can request part 47.2 (part identifier 313) because this last segment has been broken into parts in the playlist by the origin server, thereby allowing the client device to request parts of the entire media segment. Dividing a media segment into parts allows the first parts to be made available for download sooner than would have been the case if the client device had to wait for the entire media segment to become available, and this can reduce the latency of viewing that part.

The media playlist shown in FIG. 5B will be used in conjunction with the example shown in FIG. 5C to show how a client device according to one aspect can make a request for an updated playlist and also in the same request make a request for a future media segment that is contained in the updated playlist which is being requested. In the example shown in FIG. 5C, a client device can make a request 321 which includes a playlist request portion 323 and a future media segment identifier 325 and a part number 327 and a push number 329. The playlist request portion 323 can be considered a base or initial playlist request for a particular streaming media, and the future media segment identifier 325 specifies a particular media segment in a particular updated playlist which contains the media segment that is identified by the future media segment identifier 325. The part number 327 specifies a particular part within the media segment identified by the future media segment identifier 325. The push number 329 indicates that the client device is requesting a push of two parts (e.g. part three and part four) of the media segment identified by the media sequence number 47. The entire request shown in FIG. 5C is a single and concurrent request for both an updated playlist and a future media segment contained within that updated playlist. The request further specifies a particular part number of that media segment as well as the number of segments to push (2 media segments in the example of FIG. 5C). A client device can derive the request shown in FIG. 5C by examining the media playlist 301 shown in FIG. 5B and determining that the last segment in media playlist 301 is identified by the media sequence identifier 307 which includes a part identifier 313. The part identifier 313 indicates that the last segment, in this case a portion of the media segment identified by media sequence number 47, is part 2 of that media segment identified by the media sequence number 47. Thus the client device can derive, based upon a numbering convention, that the next media segment is part 3 of the media segment identified by the media sequence number 47. When part numbers are not used, the client device would examine the currently used playlist and add one (according to one aspect) to the last media sequence number to derive the identifier for the future media segment which is to be contained in the updated playlist which is to be requested.

FIG. 6 shows an example of how a server system, such as an origin server 47 or origin server 49, can process requests from a client device, such as the client device 103 which can use the methods shown in FIG. 2 or FIG. 3 or FIG. 5A and the request shown in FIG. 5C to reduce latency when receiving live streaming content. According to one aspect described herein, the server can follow the rule that a playlist cannot be completed until all media segments that are identified in the playlist are available for download. The server can operate using HTTP compliant protocols (e.g. HTTP or HTTP/2). In operation 351, the server can receive a first request for an updated playlist and a first uniform resource identifier (URL) identifying at least a portion of a media segment in the updated playlist. According to one aspect, the first request uses an HTTP compliant request. Then in operation 353, the server can determine, in response to receiving the first request, that the updated playlist is not yet available at the origin server. This can be due to the rule that requires that a playlist not be completed until all media segments in the playlist are available for download as noted above. In response to determining that the updated playlist is not available, the server in operation 357 blocks completion of a response to the first request while the updated playlist is not available. In addition, the server can keep the socket connection open which had been established to send the first request in operation 351. When the updated playlist becomes available then in operation 359, the server can transmit the updated playlist and at least a portion of the requested media segment that was requested in the request received in operation 351. In this manner, the server which uses the method shown in FIG. 6 can block requests to thereby make them hanging requests which can be serviced once an updated playlist is available while also keeping the socket connection open to a client device that made the request. This can improve the latency in the transmission of live streaming media from the server device to the client device.

Figure 7:
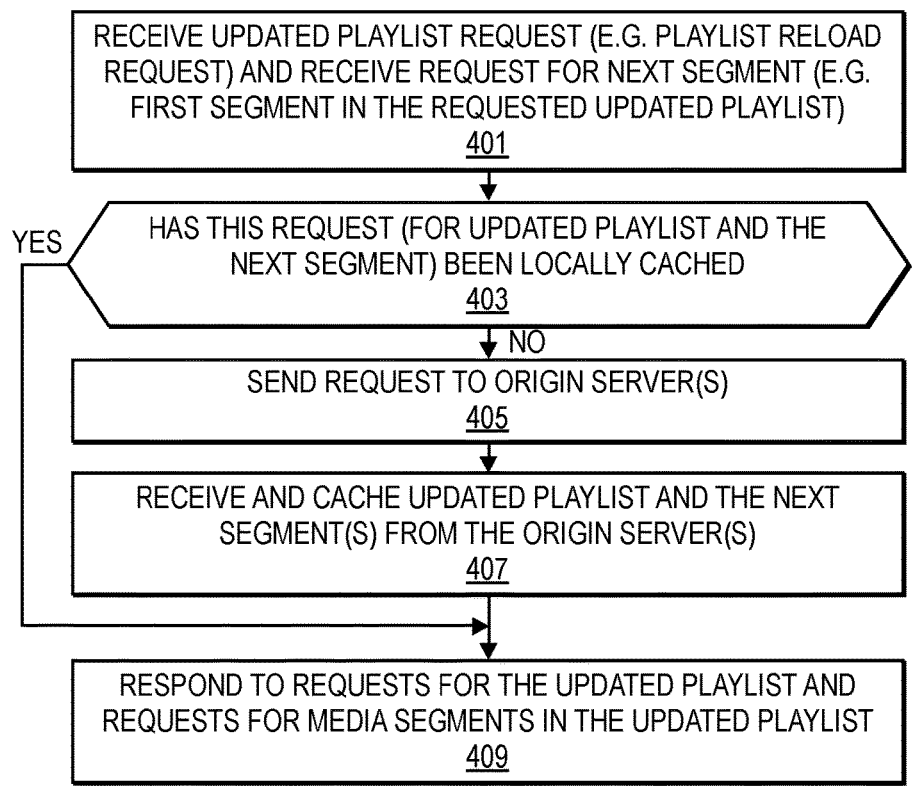
FIG. 7 is a flowchart which illustrates an aspect which can be performed by one or more servers in a content distribution network (CDN).

FIG. 7 shows an example of a method which can be performed by a server which is part of the content distribution network, such as the content distribution network 45 shown in FIG. 1B. In operation 401, a server can receive an updated playlist request such as a playlist reload request and also receive as part of that request a request for the next segment which is a segment found in the requested updated playlist. Then in operation 403 a server in the content distribution network can determine whether this request has been locally cached in the content distribution network. Servers in a content distribution network can cache requests and use these stored requests to compare to new requests to determine whether or not the server already has the requested content such as an updated playlist or a media segment. If the server has the requested content then it can respond and provide the content in operation 409. If on the other hand the request has not been locally cached, as determined in operation 403, then the server sends the request to one or more origin servers in operation 405 and awaits receipt, from the origin server(s), of the requested playlist and the requested next segment, which was requested in operation 401. Once the server receives the requested playlist and the requested next segment in operation 407, it caches both and then proceeds to operation 409 in which it responds to requests for this updated playlist and requests for media segments in the updated playlist. According to another aspect, the servers in a content distribution network can keep track of time to live (TTL) data for playlists to track whether the playlist has become outdated and needs to be refreshed from the origin server. For example, older playlists that have persisted past their TTL can be deleted in favor of keeping more recent updated playlists which can allow a client device to more quickly tune into a live streaming event.

Another aspect described in this disclosure relates to a process which can be referred to as client backfill in which a client device can seek to increase content within a local buffer by making multiple concurrent requests for known media segments when the client device determines that the buffer should be filled up. A client device can, in one implementation, use client backfill after the tune-in phase and can discontinue use of client backfill after getting one or more updated playlists that contain only a few media segments (that have not already been presented on the client device) prior to the last media segment in each updated playlist. This can indicate that these updated playlists are near the live point in the live streaming event.

Figure 8:
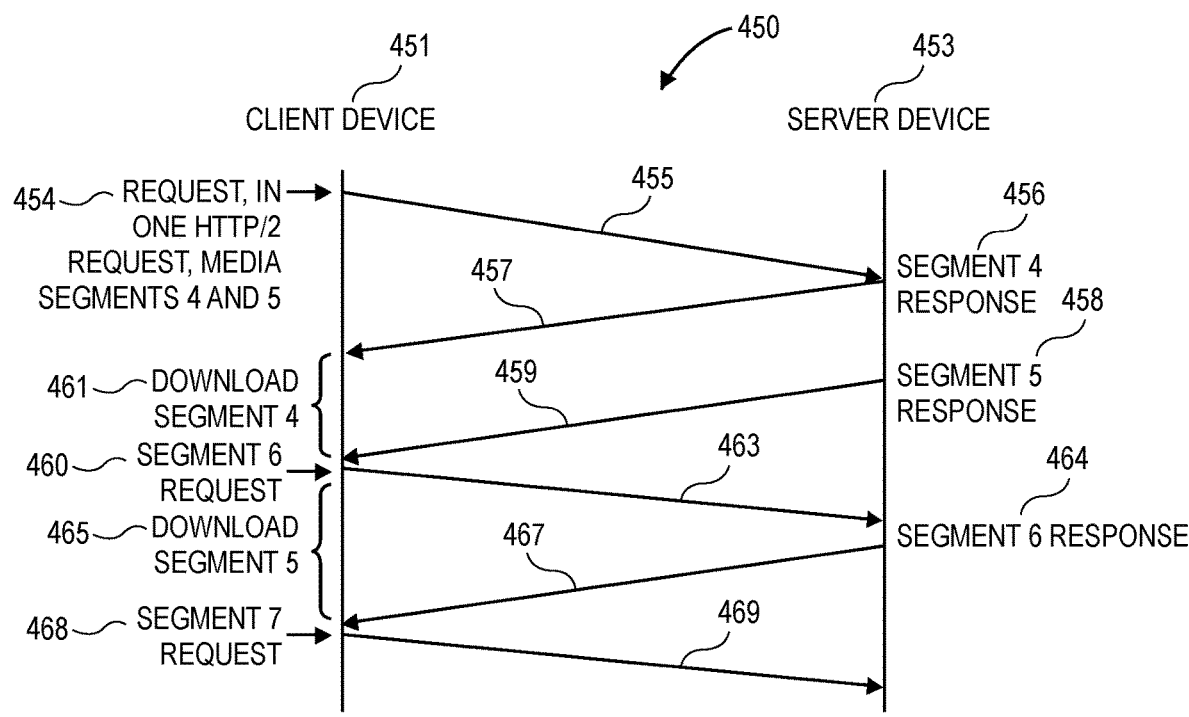
FIG. 8 shows an aspect in which a client device can, in one request, request multiple consecutive media segments and specify a download dependency between those media segments.

FIG. 8 shows an example of how a client device can use a client backfill process in the method 450 shown in FIG. 8. In particular client device 451 can, in one request 454, send one or more requests for multiple media segments (for example for media sequence numbers 4 and 5), and this request is transmitted 455 to the server device 453 which generates a segment response 456. This causes transmission 457 in which segment 4 is transmitted to the client device 451. The download of segment 4 shown as download 461 occurs during a period of time as shown vertically along the line for client device 451. At the end of the download of segment 4, the client device 451 sends request 460 (for media segment 6). In a typical implementation, the server device 453 will have also started transmission 459 of segment 5 with the segment response 458 as shown in FIG. 8. The transmission of segment 5 by the server can begin as soon as the server has finished sending segment 4 or alternatively as soon as the server receives confirmation/acknowledgement that the client has received the last portion of segment 4. Thus, the request 460 for segment 6 is sent while segment 5 is downloading. Sending the request for segment 6 (while segment 5 is downloading) has the effect of keeping an advance request in the pipeline and this avoids a round trip delay after the server sends the last bytes of segment 5 (the round trip delay resulting from the client's request for segment 6 after receiving segment 5). The time of download of segment 5 is shown as download 465 along the vertical line for the client device 451. When the download of segment 5 has been completed at the client device the client device transmits a request 468 which is the request (via transmission 469) for segment 7 which is being sent while segment 6 is being downloaded (transmission 467) as a result of the response 464 from the server device 453. In one aspect, the requests from the client device specify a dependency between the media segments so that the server can send or transmit the media segments in the proper order in time such that segment 4 is sent completely and download is completed before the server starts to send any part of segment 5. Similarly, download is completed for segment 5 before the server begins to transmit portions of segment 6. In one aspect, the dependency can be specified by a request using the HTTP/2 protocol to indicate the dependency between the different media segments over time. This can assure that the server device maintains the proper order of the segments and the dependency of the segments in order to work properly with the method shown in FIG. 8.

Figure 9:
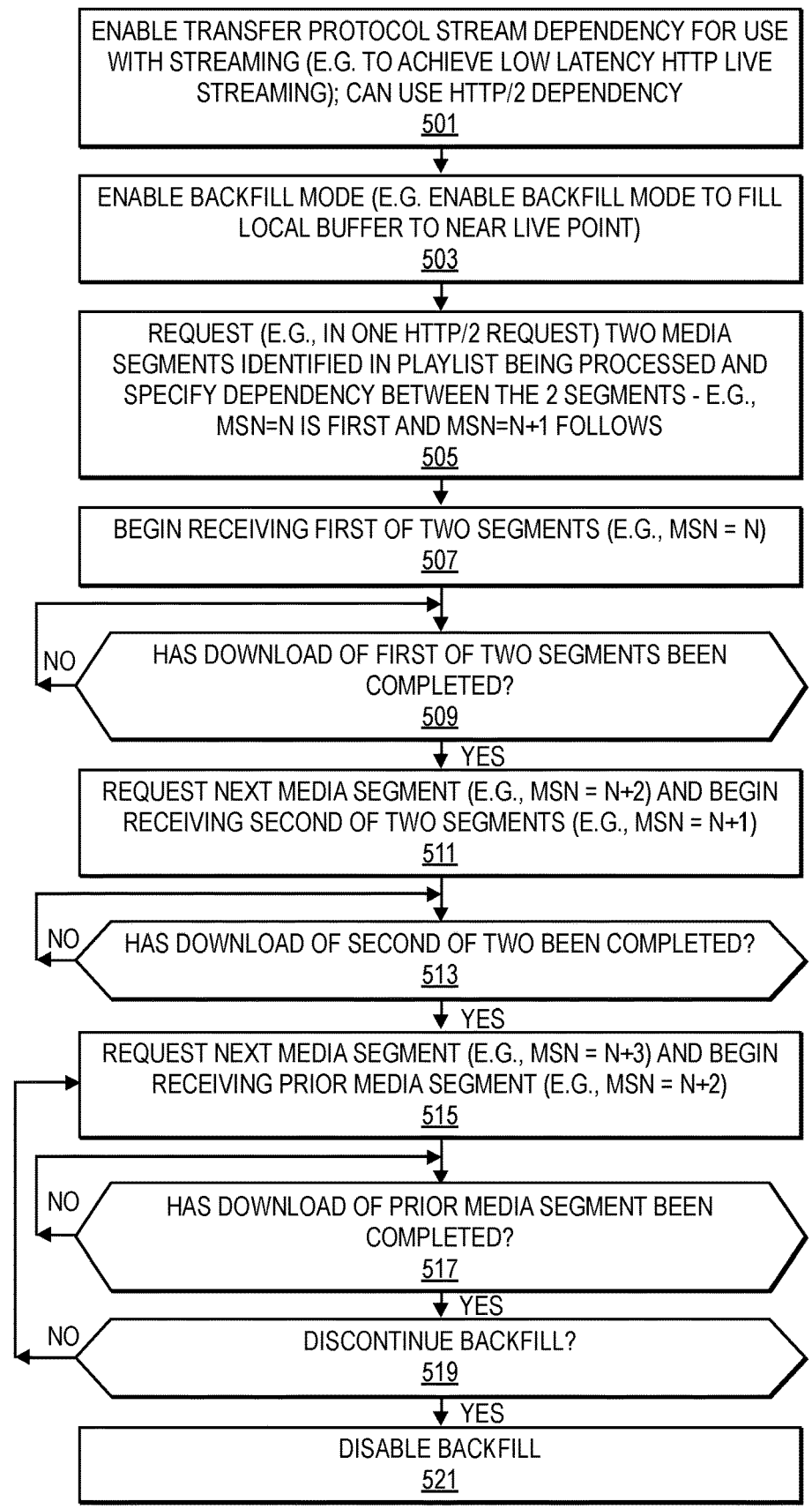
FIG. 9 is a flowchart which illustrates a method according to the aspect shown in FIG. 8.

FIG. 9 shows an example of a method performed by a client device and this method can be similar to the method 450 shown in FIG. 8. The method of FIG. 9 can begin in operation 501 in which a client device and a server device enable a transfer protocol stream dependency for use with streaming media; according to one aspect, the dependency can be specified according to the HTTP/2 dependency mechanisms. After operation 501, the client device can in operation 503 enable the backfill mode when it is determined that the client device should do so. As indicated herein, client backfill mode may be useful after the tune-in phase but not useful after receiving updated playlists which have a short list of media segments before the last media segment in the updated playlist. In this implementation, client backfill mode would be enabled after the tune in phase and then at some point discontinued as explained further below. In operation 505, the client device can request two consecutive media segments identified in the current playlist and can specify a dependency between the two segments so that the second download response is scheduled after the first download response is completed. For example, the client device can specify that a second media segment identified by a second media sequence number is dependent upon a first media segment that has a first media sequence number, where the second media segment follows the first media segment in the updated playlist being currently processed. Then in operation 507, the client device begins receiving the first of the two segments. In operation 509 the client device monitors the download of the first of the two segments to determine whether or not the download is completed. If it is not completed the client device continues to monitor the download. Once it is completed, then operation 511 is performed in which the client device requests the next media segment and begins receiving the second of the two segments which were requested in the request in operation 505. Then in operation 513, the client device determines the status of the download of the second of the two media segments and determines whether or not the download of that second segment has been completed. If it is not then processing continues to monitor the download of the second media segment. Once it is completed as determined in operation 513, the client device proceeds to operation 515 in which it requests the next media segment and begins receiving the prior media segment as before. The client device monitors the download of the prior media segment in operation 517 and continues to do so until the download is completed. At some point, the client device can determine whether or not to discontinue backfill (e.g., on a temporary basis) and this is shown as operation 519 which follows operation 517. If discontinuing backfill is determined to be appropriate then the client device proceeds to operation 521 (backfill is disabled but the client device continues to operate in a low latency using, for example, the method of FIG. 5A). Discontinuing backfill (e.g. on a temporary basis)

may be appropriate when the "playhead" (e.g., the current playback position) gets close to a near live point and/or the client device has used most of the storage capacity for buffered media segments and because too much data in the connection can impair the ability to switch to a lower bit rate rendition (due to buffer bloat). If backfill is to be continued as determined in operation 519, then processing reverts back to operation 515 as shown in FIG. 9. It will be appreciated that during the backfill mode the client device will normally specify the dependency of the various media segments so that the server can properly send the media segments in the proper sequence as described herein.

Figure 10:
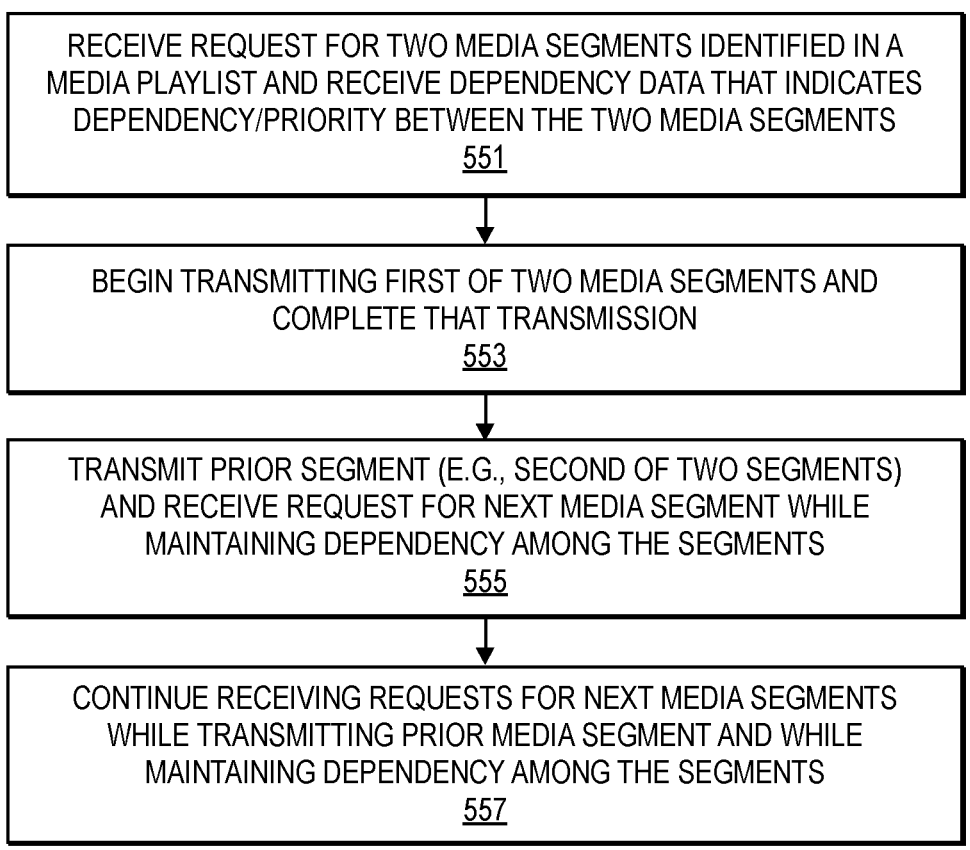
FIG. 10 is a flowchart which illustrates a method according to the aspect shown in FIG. 8.

FIG. 10 shows an example of how a server device can operate when a client device engages backfill mode and performs the process shown in FIG. 9 or the process shown in FIG. 8. Moreover, the server device 453 can perform the method shown in FIG. 10 which can begin in operation 551. In operation 551, the server receives a request for two consecutive media segments identified in a media playlist and receives a dependency data that indicates the dependency or priority between the two media segments. Then in operation 553, the server begins transmitting the first of the two media segments and completes that transmission before beginning any transmission of the next media segment. After the completion of the transmission of the first media segment, the server can, in operation 555, transmit the prior segment which can be the second of the two segments requested previously and receive a request for the next media segment in the playlist while maintaining dependency among the segments. This can continue in operation 557 in which requests are continued to be received for next media segments while transmitting the prior media segment and while maintaining a dependency among the segments.

Figure 11:
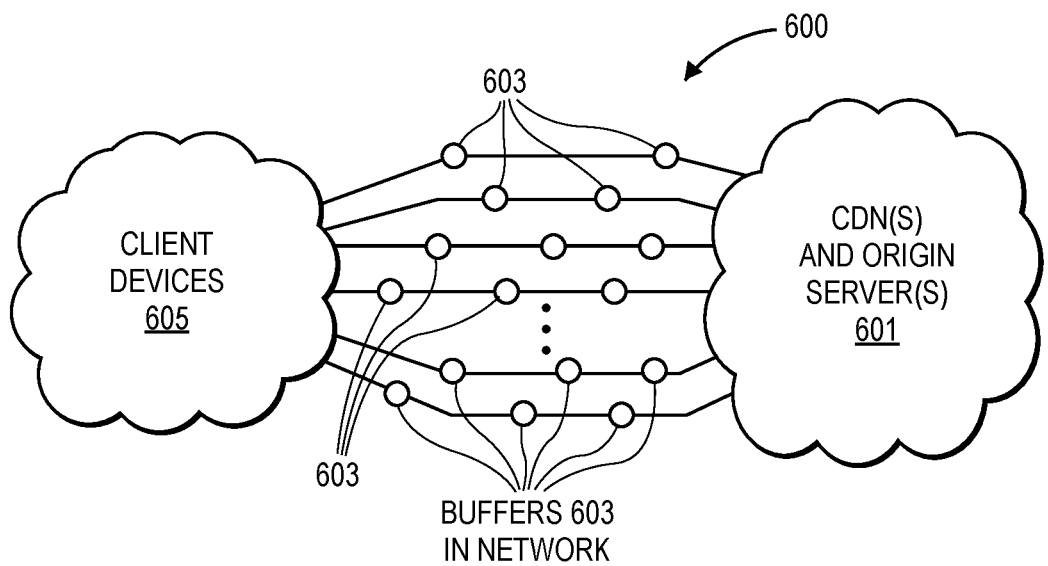
FIG. 11 shows an example of a content delivery system which includes buffers in the system.
Figure 12:
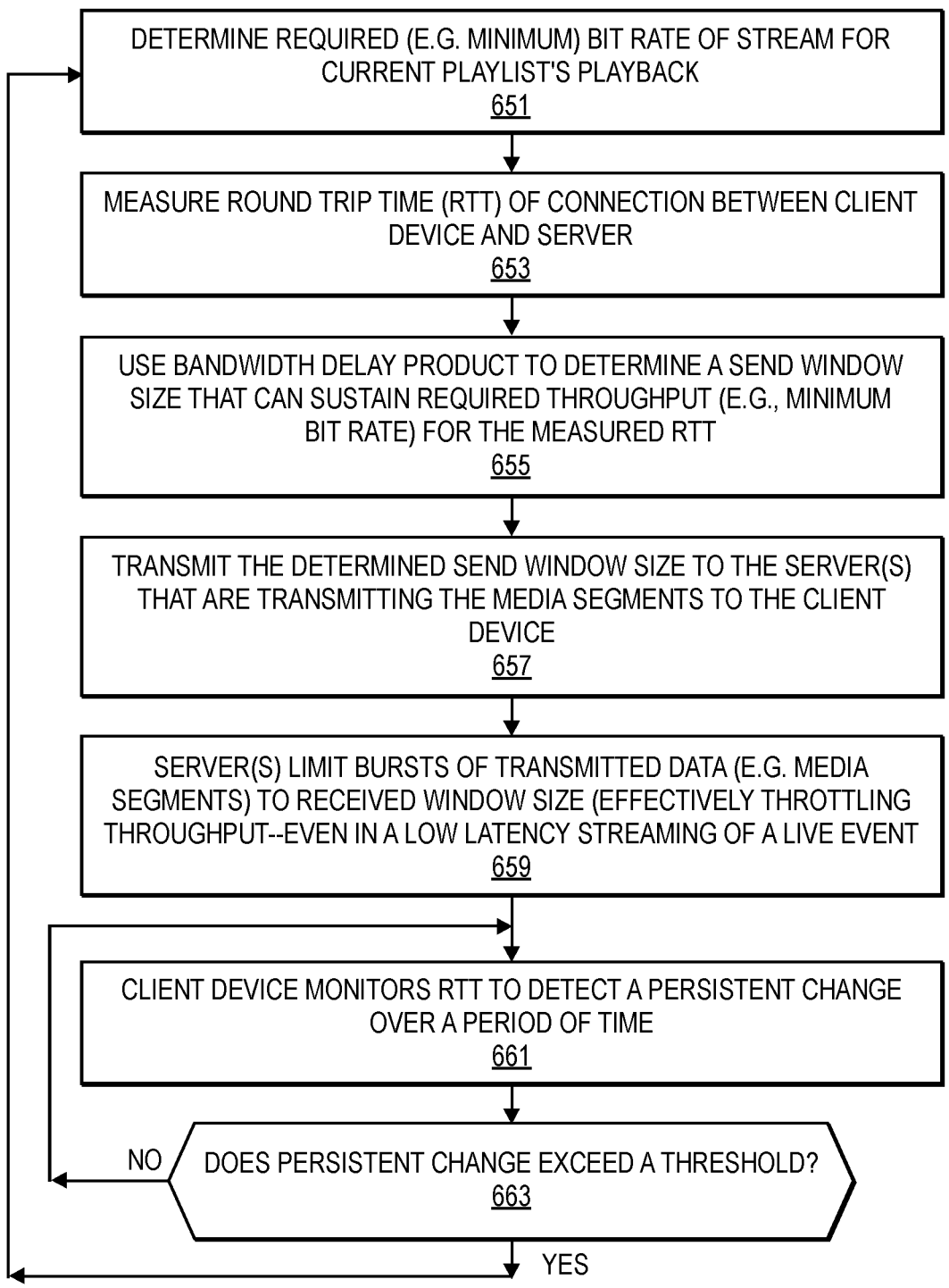
FIG. 12 is a flowchart according to one aspect which can be used to control the amount of buffered data in a content distribution system.

Another aspect described in this disclosure relates to the control of buffer bloat in buffers in the one or more networks between the client devices and the origin servers or the origin servers and content distribution network servers. FIG. 11 shows these buffers as intermediate routers 603 which buffer the streaming media content during the transmission of that content from the servers to the client devices. These intermediate routers can maintain large send buffers, and the draining of these buffers at a nominal link speed can produce the delay in responsiveness that characterizes buffer bloat. The content delivery system 600 typically includes a plurality of client devices 605 which receive the media segments from the origins servers and/or servers in the content distribution networks. The client devices 605 can be the client devices shown in FIG. 1B and the origin servers and the content distribution network can be the content distribution network 45 and the origin servers 47 and 49 shown in FIG. 1B. A method for controlling bloating of buffers such as the buffers in intermediate routers 603 in the network or networks which transmit streaming media data is shown in FIG. 12. In operation 651, a client device determines a required bit rate of the stream for the current playlist's playback. This required bit rate can be a minimum bit rate which is required to avoid or prevent stalling of playback of the media stream being retrieved through the use of the current playlist or any bit rate that all relevant parts of the network can be assured of sustaining. In operation 653, the client device can measure the round-trip time for the connection between the client device and a server device which is providing the playlists and the media segments. In one implementation, the client device can measure the round-trip time by examining timing data for packets used to open a TCP connection. In another implementation, the client device can measure the round trip time by using the HTTP/2 ping feature that cannot be spoofed by transparent TCP proxies. The HTTP/2 ping feature can be protected by encryption that HTTP/2 provides and use of this ping feature may be more reliable for providing accurate RTT particularly for networks that use transparent proxies. Then in operation 655, the client device can calculate a bandwidth delay product to determine a send window size that can sustain the required throughput specified by the required bit rate or minimum bit rate for the measured round-trip time. In one implementation, the bandwidth delay product (BDP) can be the multiplication of the round-trip time (RTT) measured in operation 653 by the minimum required bit rate (RBR) determined in operation 651 (e.g. BDP=RTT×RBR). In one implementation, the send window size can be determined directly from the bandwidth delay product by dividing the bandwidth delay product by eight or by using other techniques known in the art to derive a send window size. After the send window size is determined in operation 655, the client device can in operation 657 transmit the determined send window size to the one or more servers that are transmitting media segments to the client device. Then in operation 659 the one or more servers can limit bursts of transmitted data, such as media segments, to the received send window size, and this effectively throttles throughput and this can be used even in situations in which low latency streaming of a live event has been enabled using, for example the methods described herein. Hence, according to this aspect, while low latency can be maintained to allow streaming live events to have a low latency, buffer bloat can also be controlled by limiting bursts to the send window size determined by the client device according to the implementation example shown in FIG. 12. After transmitting the determined send window size in operation 657, the client device can monitor the round-trip time in operation 661 to determine whether or not there is a persistent and significant change over a period of time in the round-trip time. If a persistent change has been determined to have existed for a period of time and that persistent change exceeds a threshold, operation 663 can cause the client device to recalculate the send window size by causing operation 663 to repeat the process by reverting back to operation 651 as shown in FIG. 12. The throttling of throughput using the method of FIG. 12 can be combined with various other aspects described herein to achieve both control of buffer bloat (to avoid congestion in the network transmitting the media segments) and also a reduction of latency to a low latency level for live streaming media. For example, the method shown in FIG. 12 can be combined with the methods shown in FIGS. 2, 3, and 5A as well as other methods described herein which reduce latency for live streaming media. The method of FIG. 12 is one of several possible ways to restrict the send window size to avoid excessive buffering inside intermediate routers; the BDP is one way to determine a send window size but other ways can alternatively be used to pick a send window size to reduce excessive buffering while not overly harming downstream bandwidth.

Other aspects described in this disclosure relate to how low latency can be achieved even when switching between renditions of streaming media such as different bit rate renditions of the same streaming media content such as the same live sports event. FIGS. 13, 14, 15, and 16 relate to such aspects in which a client device can switch between renditions of the same particular streaming media content such as a particular live sports event. The method shown in FIG. 13 can utilize rendition reports to allow a client device to switch between renditions and to also quickly tune into a near live point in the new rendition. Rendition reports can specify, for each rendition, information indicating the latest updated playlist which is near the live point in a live streaming media. The client device can request, in operation 701, a rendition report; this request can be through a playlist request attribute that is provided as part of an updated playlist request in one aspect. The client device can make this request for a rendition report while playing back from a stream of a current rendition and the request for a rendition report can be part of a request for an updated playlist (so the request for the rendition report is in the same channel of communication as the request for the updated playlist). For example, the client device may request a rendition report for a higher bit rate rendition which is higher than the current rendition and may also request a rendition report for a lower bit rate rendition that has a lower bit rate than the current rendition currently being presented by the client device through use of the current playlist. In another example, the client device may request only one rendition report based upon the current connection status and the amount of throughput on that connection status and the history of that throughput; for example if throughput has been declining persistently over time during the presentation of the streaming media content, the client device may request only rendition reports for lower bit rate renditions so that the client can be prepared to switch to a lower bit rate rendition as conditions deteriorate on the connection. In one example, the client device may request a set of one or more rendition reports in response to determining to switch to another rendition (from the currently received rendition) and the report or reports can be based on the rendition to be switched to. Alternatively, the client device can receive a rendition report that is contained in a received updated playlist, without having to separately request the rendition report. A server, in operation 703 can transmit the requested rendition reports in response to the request for one or more rendition reports and the rendition report can be bundled with the updated playlist response from the server so that the client and server do not need to create another channel for communication of up-to-date information about different renditions and the responses (including the rendition reports) can be cached in the CDN for the benefit of other clients making the same requests. Alternatively, the server can transmit the rendition reports as part of the updated playlists without requiring the client devices to request the rendition reports. The rendition reports can contain data indicating media sequence numbers for each rendition, which media sequence numbers represent the latest available playlists or most recent updated playlists based upon a near live point in the live streaming media content. The client device can use the information in the rendition report when switching to a new rendition to allow a quicker tune in to the new renditions near live point as specified by information in the rendition report, such as the media sequence number specified in the rendition report. For example, a rendition report for a lower bit rate rendition can indicate an msn=56 for the latest near live point for the lower bit rate rendition and a rendition report for a higher bit rate rendition can indicate an msn=97 for the latest near live point for the higher bit rate rendition.

A set of one or more server systems can operate as shown in FIG. 13 by collecting data, such as URIs for the most recent media segments near the end of the most recent updated playlists, and this collected data can be used to generate the rendition reports. Once generated, the rendition reports can be transmitted as part of the transmission of updated playlists (e.g., the rendition reports are contained within the updated playlists) that are received by client devices or can be transmitted separately from the transmission of the updated playlists. Origin servers can generate the updated playlists and the set of rendition reports and transmit these to caching servers which in turn can transmit the updated playlists to client devices upon requests from the client devices.

FIG. 14 shows another aspect described in this disclosure in which playlist annotations are used to improve latency when switching between renditions by using the playlist annotations to avoid downloading media segments (in the new rendition) which are not useful because they cannot be decoded. In the playlist 720 shown in FIG. 14, there are several media segment identifiers, including media segment identifiers 721, 722, 727, and also part identifiers 723, 725, 726, and 728. The playlist shown in FIG. 14 includes three whole media segments (media sequence numbers 42, 43, and 44) and a portion (part 1) of a fourth media segment (media sequence number 45). In addition, the playlist shows annotations 724 and 729 which respectively indicate that the portion of the media segment identified by part identifier 723 and the portion of the media segment identified by part identifier 728 include an independent frame which can be decoded independently of other frames to yield a visible image for display. In one aspect, an independent frame is a keyframe that contains all necessary data to derive and decode an encoded image in the keyframe, and dependent frames that follow in time the independent frame use data in the keyframe to decode encoded images in the dependent frames; dependent frames can include P and B frames that include difference data relative to an independent frame on which they depend. The media segment identified by part identifier 725 and the media segment identified by part identifier 726 are dependent frames and cannot be decoded into a valid image for a frame of video without having access to the prior independent frame which in this case is provided by the media segment identified by part identifier 723. The playlist 720 includes a "legacy" media segment identifier 727 in addition to the part identifiers for the same media segment which has a media sequence number 44 as shown in FIG. 14. Thus client devices which cannot process the part tag (such as the tags which are included in the part identifiers 723, 725, and 726) can use the legacy media segment identifier 727 to request the entire media segment having the media sequence number 44. According to one aspect, the part identifiers can be provided for only the later media segment identifiers and not the segment identifiers at the beginning of the playlist to avoid unnecessarily enlarging the area of the playlist that is not near to the live edge. A client device can use the annotation of the independence of a frame within a media segment to avoid downloading dependent frames in the process of switching between renditions. This is shown further below in conjunction with FIG. 16 which will be described further below.

A set of one or more server systems can generate playlists, such as updated playlists that contain annotations (such as annotations 724 and 729) that indicate that their respective media segments contain independent frames. During the process of encoding media segments, the one or more server systems can determine when media segments contain only dependent frames and when media segments contain one or more independent frames. When a media segment contains at least one independent frame, the server can annotate the media segment with an annotation, in the updated playlist or other playlist, that indicates that the media segment contains at least one independent frame. The annotation of the media segment in a playlist can be used by client devices to avoid downloading of dependent media segments that precede an independent frame in a later media segment when switching between renditions. The generated playlists, containing such annotations, can then be transmitted to one or more client devices (either directly or indirectly through caching servers).

Figure 15:
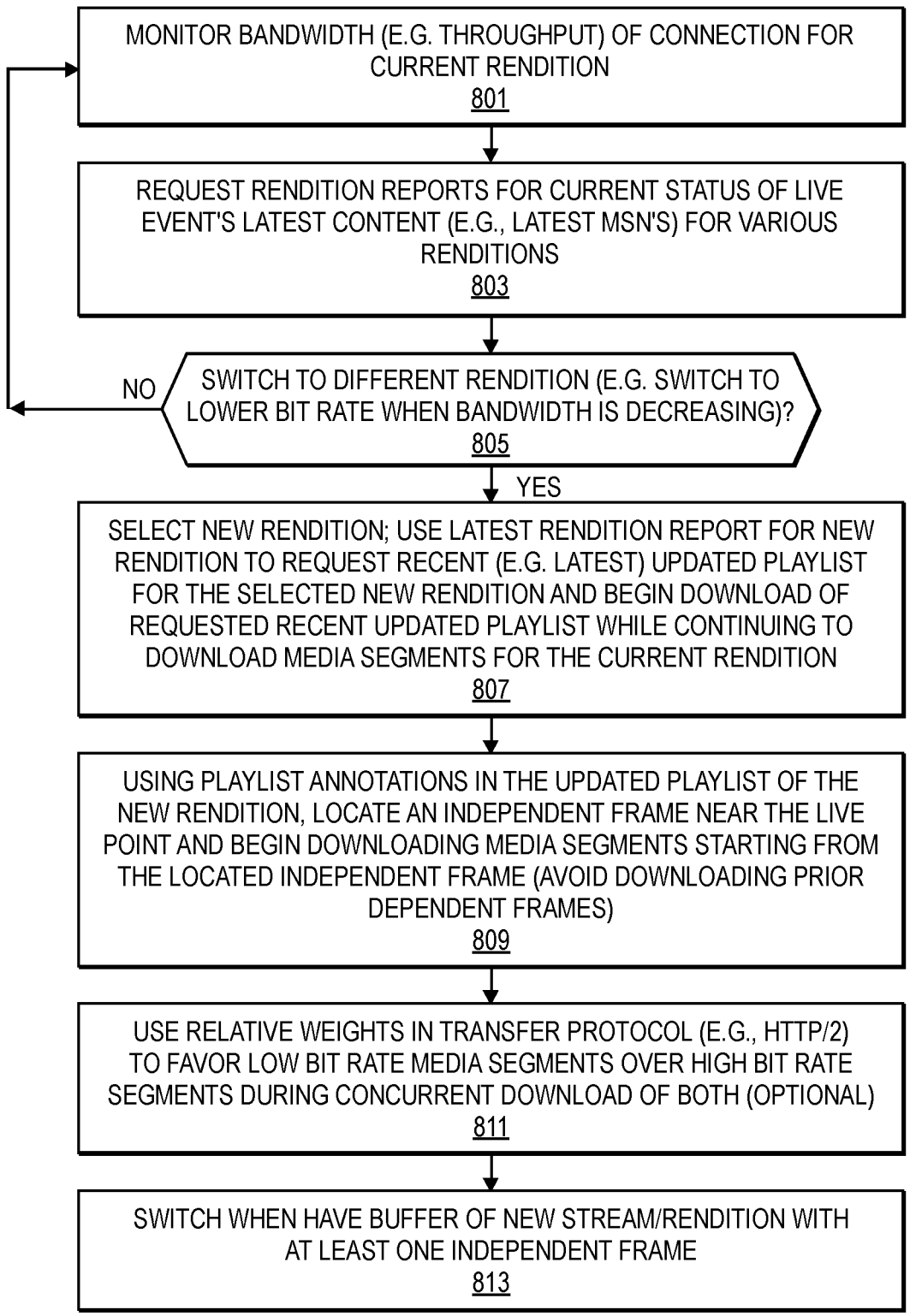
FIG. 15 is a flowchart which illustrates one or more aspects that can be used when switching between renditions.

FIG. 15 shows a method according to an embodiment which can combine multiple aspects into a single process when switching between renditions and while also attempting to maintain a low latency for a live streaming event. It will be appreciated that some of these aspects may be excluded from an implementation instead of using all of the aspects as shown in FIG. 15; thus, a subset (one or more) of the aspects shown in FIG. 15 can be used in an implementation instead of all of these aspects. A typical method can begin as shown in operation 801 in which the client device monitors the bandwidth or throughput of a connection for the current rendition of the streaming media content. While monitoring the bandwidth, the client device can periodically and repeatedly request (or receive without requesting) rendition reports in operation 803 for the current status of the live event's latest content for various renditions. These requests for rendition reports can be bundled with (and be part of) requests for updated playlists, and the server can respond to these requests with updated playlists that are bundled with the requested rendition reports. For example, these rendition reports can specify the latest and most recent media sequence numbers for each rendition requested by the client device. In one implementation, a client device can ask for two rendition reports, one for a higher bit rate rendition than the current rendition and another for a lower bit rate rendition than the current rendition. In other implementations, a client device may ask for all rendition reports. FIG. 13 described herein provides more information with respect to rendition reports and how they can be utilized as part of operation 803. In operation 805 the client device determines whether or not to switch to a different rendition. For example, when the connection is deteriorating (e.g., bandwidth is decreasing), the client device can decide to switch to a lower resolution rendition when the bandwidth decreases. On the other hand when bandwidth is improving, the client device can switch to a higher bit rate rendition (which can provide higher resolution images). If no switch is determined in operation 805, the client device reverts back to operation 801 and continues the process as shown in FIG. 15. If on the other hand the client device decides to switch to a different rendition, then in operation 807, the client device selects the new rendition and can use the latest rendition report for the selected new rendition to request a recent (e.g. the latest available) updated playlist for the new rendition that has been selected in operation 807.

The latest rendition report, as explained herein, specify through an msn value or other mechanism, a recent media segment in a recent updated playlist such as the latest available playlist to allow the client device to quickly tune-in to a near live point in the streamed content for the new rendition. The client device in operation 807 can begin the download of the recent updated playlist by requesting that playlist and can also continue to download media segments from the current rendition before switching to the new rendition. Thus, according to one aspect, the client device can concurrently download both media segments from the current rendition and the recent updated playlist for the new rendition.

According to one aspect of this disclosure, a client device in operation 809 can use playlist annotations in the recent updated playlist for the new rendition to select media segments for downloading rather than beginning to download the first media segment in the recent updated playlist, and this can avoid downloading media segments that cannot be used, such as media segments that are dependent frames that depend on an independent frame that is not in the recent updated playlist for the new rendition. According to one implementation's aspect, operation 809 can be optional, so the use of playlist annotations can be optional; if the recent updated playlist for the new rendition does not include playlist annotations, then operation 809 is not performed in a process of switching to the new rendition. Once media segments for the new rendition are selected for download, they can be requested to begin their download. In one implementation according to an aspect of this disclosure, media segments for both the current rendition and the new rendition can be requested and concurrently downloaded at least until a switch to the new rendition has been completed.

In one aspect of this disclosure, the client device can optionally use (in operation 811) relative weights in a transfer protocol (such as the HTTP/2 protocol) to specify a download/send priority (prior to the switch) to favor one set of media segments (e.g. the lower bit rate media segments) over the other set of media segments. If the client device uses the relative weights, the server(s) will send more media segments of the lower bit rate rendition than media segments of the higher bit rate rendition over a given period of time according to one aspect of this disclosure. For example, a client device can specify a pair of values, such as 200 (for the lower bit rate rendition) and 56 (for the higher bit rate rendition) (out of a total of 256); that can cause the server(s) to concurrently send about 4 times as many media segments of the lower bit rate rendition than the higher bit rate rendition over the same period of time. This favoring of the transmission of media segments of the lower bit rate rendition over transmission of media segments of the higher bit rate rendition can occur for at least a portion of time, while buffering media segments for the new rendition, prior to the actual switch to the new rendition. During this time prior to the switch, media segments for both renditions can be downloaded (e.g., received from the servers) and buffered while the media segments for the current rendition are presented (e.g., displayed on a display device along with sound from the current rendition). A client device can, in one implementation, decide to switch after buffering at least one independent frame (as indicated by a playlist annotation) of the new rendition in operation 813. An example is shown in FIG. 16 of operation 813 when the switch can occur.

Figure 16:
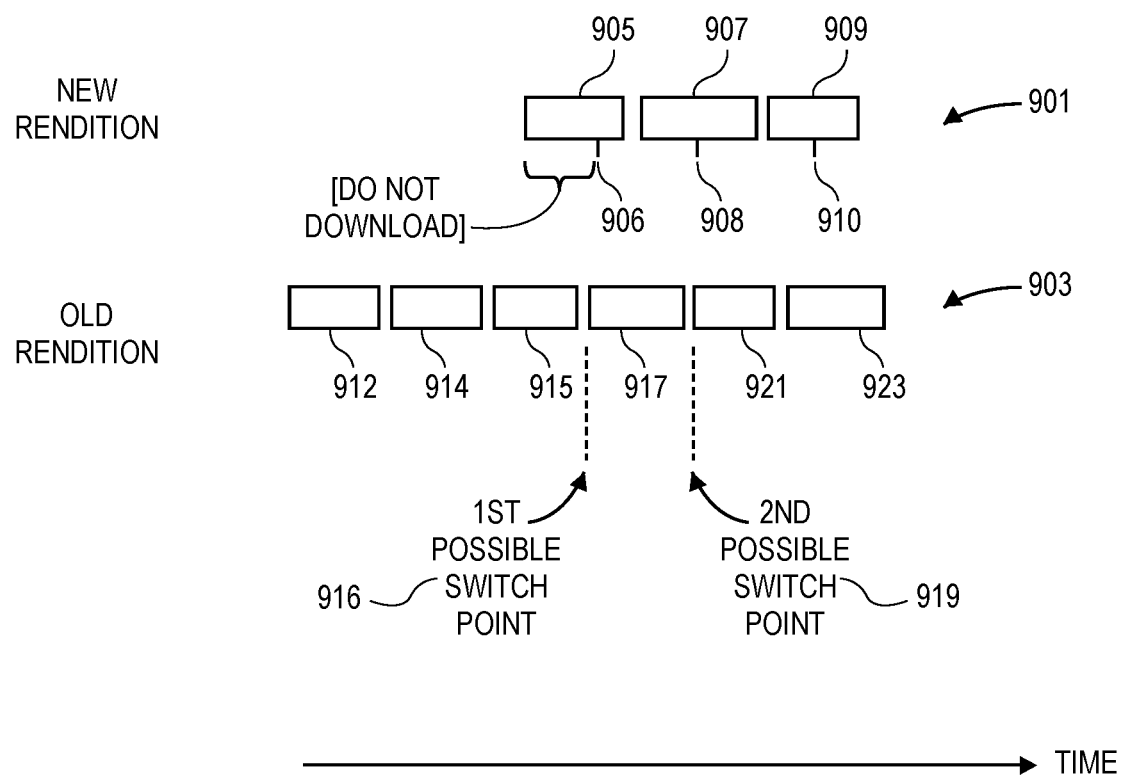
FIG. 16 shows an example of an aspect of switching between renditions which can use playlist annotations as described herein.

Referring now to FIG. 16, a new rendition 901 is shown in time relative to the old rendition 903. The client device has decided to switch to the new rendition 901 but has continued to download the old rendition 903 while selectively determining which media segments (or portions of such segments) to download and while beginning to buffer selected media segments from the new rendition 901. The client device has determined, from playlist annotations in an updated playlist for the new rendition, that there are two possible switch points 916 and 919 based upon the presence of independent frames 906 and 908 respectively which are specified in the playlist containing the media segments 905, 907 and 909. In particular, playlist annotations in the playlist for the new rendition 901 indicates the existence and location of the independent frames 906 and 908 within each of the media segments 905 and 907 respectively. Because all of the frames in media segment 905 prior to independent frame 906 are dependent frames, the client device can decide to avoid the download of those dependent frames. Hence, the first possible switch point is switch point 916 (at independent frame 906) and the second possible switch point is switch point 919 because it also includes an independent frame 908. A third possible switch point is at independent frame 910 in media segment 909. The media segments 912, 914, 915 and 917 of the old rendition 903 are downloaded concurrently with the downloading of at least one media segment from the new rendition 901; media segments 921 and 923 from the old rendition 901 may also be downloaded if a later switch point, such as switch point 919, is selected by the client device as the point in time to switch to the new rendition from the old rendition (and hence the new rendition is presented on the client device instead of the old rendition). A switch can occur when the client device has stored in its buffer the new rendition with at least one independent frame. In one implementation, the client device may not decide to switch with just a single independent frame but rather wait until multiple independent frames have been buffered such as in the example shown in FIG. 16.

Further Details for an Example of an Implementation

The following section describes how low latency streaming can be an extension of the existing HTTP Live Streaming (HLS) protocol that is documented in RFC 8216 (Pantos, R. and May, W., "HTTP Live Streaming", RFC 8216, August 2017, https://www.rfc-editor.org/info/rfc8216) and draft-pantos-hls-rfc 8216 bis (see https://tools.ietf.org/html/draft-pantos-hls-rfc8216 bis-00). The HLS protocol is augmented with features that allow client devices (e.g. smartphones, tablet computers and other data processing systems) to support video latencies of two seconds or less over public networks in many instances. This section is an example of an implementation that is not to be construed as limiting other implementations described above, although the implementations and aspects described above may optionally make use of one or more aspects described in this section. For example, the use of the word "must" in this section is not to be construed as limiting the other implementations described above. The use of the word "must" for this section means the feature is highly desirable to achieve a very low latency for HLS streaming or is required for compatibility with a low latency HLS protocol described in this section. The syntax of this augmentation of the HLS protocol is backward compatible with existing HLS so clients can fall back to regular latency HLS playback if low latency HLS is not supported by a server (or the client).

Playlist Request Parameters

A client device can request an updated playlist with a request that includes one or more query parameters: parameter HLS_msn=<N>; parameter HLS_part=<M>; parameter HLS_push=<0/1>; and parameter HLS_report=<uri>. The parameter HLS_msn=<N> indicates that the server must hold the request until a playlist contains media sequence N or later. The parameter HLS_part=<M> in combination with parameter HLS_msn indicates that the server must hold the request until a playlist contains part M of media sequence N or later; the first part of a media segment is HLS_part=0, the second part is HLS-part=1, etc. The use of parameter HLS part requires the use of parameter HLS_msn. The parameters HLS_msn and HLS_part do not trigger blocking at the server if the playlist contains a tag (e.g. EXT-X-ENDLIST tag) indicating the end of the stream (no more content). If a client device asks for a part number greater than the final part in a media segment, the server must deliver a playlist containing the first part of the following media segment. In one implementation a server should use a timeout duration, which triggers a 503 (service unavailable) response by the server, of 3 times the target duration (for media segments) specified in the media playlist; multipliers other than 3 may be used. The parameter HLSpush=<0/1> indicates whether the server should push the requested future media segment (or portion thereof) along with the playlist response; 1 indicates to push the future media segment and 0 indicates do not push. The parameter HLS_report=<uri> requests that the playlist response contain an EXT-X-RENDITION-REPORT tag for the specified rendition; the uri points to the media playlist of the specified rendition, and the uri should be relative to the uri of the media playlist request being made. Multiple report parameters are allowed for different URIs. Client devices must sort all low latency HLS query parameter in UTF-8 order and place them after any other query parameters in the URL; this practice will increase CDN cache utilization.

Media Playlist Tags and Media Segment Tags

A blocking reload tag EXT-X-BLOCKING-RELOAD: <attribute-list> in a media playlist from a server indicates support for low latency HLS and is required, in this implementation, in order for the server to indicate such support to client devices that receive the media playlist. All media playlists, in this implementation, must include this tag with the same attributes and values if such support is provided by the server. An attribute, in the attribute list of this tag, can be part-target=<s> which indicates a part target duration in floating point seconds; the part target duration can be the maximum duration of any partial media segment (e.g. a media segment specified by _HLS_msn and _HLS part). All partial media segments, in this implementation, except for the last part of a media segment, must have a duration of at least (for example) 85% of part-target=<s>. Another attribute in the attribute-list of this blocking reload tag can be hold-back=<s> which is the blocking-reload hold back duration in floating point seconds; this hold back duration of hold-back=<s> seconds from the end of the playlist is the minimum distance (in time) from the end of a live playlist at which playback should be allowed to begin or to which a player should seek. In this implementation, the value of s in the hold-back=<s> attribute must be greater than or equal to the value of s in the part-target=<s> attribute; for example, it is recommended that the value of s in the hold-back=<s> attribute be at least 3 times greater than the value of s in the part-target=<s> attribute.

A tag to identify parts of a media segment ("partial segment") can be of the form: EXT-X-PART:<attributelist>. In this implementation, a parallel channel of parts of media segments is provided by the server(s) with another channel of whole media segments also provided by the server(s). The parallel channel is used to distribute the media at the live edge of the media playlist wherein the media is divided into a larger number of smaller files such as CMAF (Common Media Application Format) chunks. Each of these smaller files is one of the parts (also referred to as partial segments). Because each partial segment has a shorter duration than the whole media segment, the partial segment can be packaged, published and added to the media playlist much earlier than the whole media segment. While a whole media segment may be, for example, about 6 seconds in duration, each partial segment may be, for example, only 200 milliseconds. So a first partial segment might be published only 200 milliseconds after the previous whole segment has been published, followed by 29 of its peers, followed at last by a regular, whole 6 second media segment ("parent segment") that contains the same media as the concatenation of its 30 partial segments. In order to reduce media playlist bloat, partial segments can be removed from the media playlist once they are greater (older) than, for example, 3 target durations from the live edge. Partial segments are primarily useful for operating/navigating close to the near live point (also referred to as the live edge); beyond that, their presence does not justify the increase in the media playlist's size and the burden, on the server(s), of retaining the parallel partial segment stream (in addition to the regular whole media segment stream). In this implementation, the set of EXT-X-PART tags between EXTINF tags must represent the same set of media as the segment of the following EXTINF tag. Media segment tags (such as EXT-X-DISCONTINUITY, EXT-X-KEY, and EXT-X-BYTERANGE) in this implementation must not appear between two EXT-X-PART tags of the same parent segment, with the exception of EXT-X-DATERANGE. The EXT-X-PART tag can include the following attributes: DURATION=<s>; URI=<str>; INDEPENDENT=YES; and BYTERANGE=<n>[@<o>]. The attribute DURATION=<s> indicates the duration of the part in floating point seconds and is a required attribute in this implementation. The attribute URI=<str> indicates the URI for the part and is also a required attribute in this implementation. The attribute INDEPENDENT=YES indicates that the part contains (at least) the start of an independent frame (which can be decoded without using any prior frames) and is a required attribute if applicable to the media being streamed. The attribute BYTERANGE=<n>[@<o>] indicates that the part is a sub-range of the URI.

A tag used to provide a rendition report for a rendition can be of the form: EXT-X-RENDITION-REPORT:<attribute-list>; this tag is added by the server to a media playlist in response to a "report" query parameter from a client device (e.g. see operations 701 and 703 in FIG. 13). The tag carries information about an associated rendition that is as up-to-date as the playlist that contains the tag with the information. A server may provide more RENDITION-REPORT tags than are requested by a client device. The EXT-X-RENDITION-REPORT:<attribute-list> tag can include the following attributes: URI=<URI>; LAST-MSN=<N>; and LAST-PART=<M> and may also provide LAST-I-MSN=<NI> and LAST-I=PART=<MI>. The attribute URI=<uri> indicates (e.g. identifies) the media playlist described in the report for the rendition and it should be the same string as the report query parameter and is required to be provided in the tag in this implementation. The attribute LAST-MSN=<N> indicates the media sequence number of the last media segment currently in the specified rendition and is required to be provided in the tag in this implementation. The attribute LAST-PART=<M> indicates the last media part of the media segment specified by the media sequence number (msn) currently in the specified rendition. The attribute LAST-I-MSN=<NI> indicates the msn of the last media segment containing (at least) the start of an independent frame currently in the specified rendition, and the attribute LAST-I-PART=<MI> indicates the last independent part (containing at least the start of an independent frame) of the last media segment that contains at least the start of an independent frame.

Server Configuration Profile

Low latency HLS requires, in this implementation, certain transport features above and beyond what is used in regular latency HLS as documented in RFC 8216 (identified above), and client devices should verify that these features are supported before engaging low latency mode at the client device.

Low latency HLS streams must, in this implementation, be served via an HTTP/2 protocol, and the use of a TCP protocol is recommended while QUIC (a recently developed transport layer network protocol) may be used in future implementations. Several features in HTTP/2 should be used including: multiple stream control for dependencies and weights (described above), HTTP/2 push (e.g. of a future media segment with an update playlist response), and HTTP/2 Ping (for use in measuring RTT). In this implementation, servers must support HTTP/2 priority controls for stream dependencies and weights (e.g. between renditions when switching between renditions). In this implementation, each server should serve an entire set of tiers or renditions in a master playlist, and this allows for rapid tier or rendition switching without connection reestablishment. In other words, the server should serve all of the media playlists specified in the master playlist. In this implementation, if TCP is used, such TCP implementations must support SACK (Selective Acknowledgement—see RFC 2018 for more information) across the entire route from client to server. Also, if TCP is used in this implementation then the use of TCP timestamp, ECN (Explicit Congestion Notification—see RFC 3168 for more information), TAIL LOSS probe (see RFC 7323 and https://tools.ietf.org/html/draft-dukkipati-tcpm-tcp-loss-probe-01 for more information), and TCP RACK (Recent Acknowledgement—see https://tools.ietf.org/i/draft-ietf-tepm-03.html) are recommended in order to improve the performance of TCP loss recovery.

In this implementation of low latency HLS, media playlists (but not media segments) must be compressed using, for example, GZIP; this can speed up media playlist reload (playlist updating) and rendition switching. An example of playlist compression is described in U.S. Pat. No. 8,156,089.

In this implementation of low latency HLS, CDNs and proxy caches must recognize client playlist requests that match an existing request that is currently outstanding at the origin server and hold these duplicate requests until the origin server responds to the existing request. FIG. 7 provides an example of this process. CDNs have different names for this feature; for example, an Apache Traffic server refers to this feature as reader-while-writer. This feature is highly desirable due to the active origin.

In this implementation of low latency HLS, it is recommended to cache (e.g. in CDNs) playlist requests with low latency HLS query parameters for 6 target durations, so if a target duration of a media segment (in the requested playlist) is, for example, 6 seconds then these playlist requests should be cached for 36 seconds (so their Time-To-Live, TTL, can be set at 36 seconds). It is recommended to cache unadorned playlist requests/responses for one-half a target duration. Origins should use cache-control headers to indicate cache lifetimes. It is also recommended that playlists for different renditions be updated concurrently so they are substantially synchronized to within 1 target duration or smaller (e.g. to within 1 part target duration which may be 200 milliseconds). Using these caching recommendations can improve caching efficiency.

In this implementation of low latency HLS, media playlists must have PROGRAM-DATE-TIME tags; these tags allow more precise mapping between media segments across different renditions of the program. However, clock synchronization between client and server is not required. A 6 second target duration is recommended for low latency HLS. A GoP (Group of Picture) size of 1 to 2 seconds is recommended for low latency HLS.

The following media playlist is an example of a low latency HLS playlist that includes the augmentations to HLS that have been described in this section and also in other parts of this disclosure.

Example of a Low Latency HLS Playlist

```
#EXTM3U
# This playlist was a response to: GET
https://example.com/2M/waitForMSN.php?_HLS_msn=273&_HLS_part=2&_HLS_report
=../1M/waitForMSN.php&_HLS_report=../4M/waitForMSN.php
#EXT-X-TARGETDURATION:4
#EXT-X-VERSION:3
#EXT-X-BLOCKING-RELOAD:PART-TARGET=0.33334,HOLD-BACK=1.0
#EXT-X-MEDIA-SEQUENCE:268
#EXT-X-PROGRAM-DATE-TIME:2019-02-14T02:13:36.106Z
#EXTINF:4.000008,
fileSequence268.ts
#EXTINF:4.000008,
fileSequence269.ts
#EXTINF:4.000008,
fileSequence270.ts
#EXT-X-PART:DURATION=0.33334,URI="filePart271.1.ts"
#EXT-X-PART:DURATION=0.33334,URI="filePart271.2.ts"
#EXT-X-PART:DURATION=0.33334,URI="filePart271.3.ts"
#EXT-X-PART:DURATION=0.33334,URI="filePart271.4.ts"
#EXT-X-PART:DURATION=0.33334,URI="filePart271.5.ts",INDEPENDENT=YES
#EXT-X-PART:DURATION=0.33334,URI="filePart271.6.ts"
#EXT-X-PART:DURATION=0.33334,URI="filePart271.7.ts"
#EXT-X-PART:DURATION=0.33334,URI="filePart271.8.ts"
#EXT-X-PART:DURATION=0.33334,URI="filePart271.9.ts"
#EXT-X-PART:DURATION=0.33334,URI="filePart271.10.ts"
#EXT-X-PART:DURATION=0.33334,URI="filePart271.11.ts",INDEPENDENT=YES
#EXT-X-PART:DURATION=0.33334,URI="filePart271.12.ts"
#EXTINF:4.000008,
fileSequence271.ts
#EXT-X-PART:DURATION=0.33334,URI="filePart272.a.ts"
#EXT-X-PART:DURATION=0.33334,URI="filePart272.b.ts"
#EXT-X-PART:DURATION=0.33334,URI="filePart272.c.ts"
#EXT-X-PART:DURATION=0.33334,URI="filePart272.d.ts"
#EXT-X-PART:DURATION=0.33334,URI="filePart272.e.ts"
#EXT-X-PART:DURATION=0.33334,URI="filePart272.f.ts",INDEPENDENT=YES
#EXT-X-PART:DURATION=0.33334,URI="filePart272.g.ts"
#EXT-X-PART:DURATION=0.33334,URI="filePart272.h.ts"
#EXT-X-PART:DURATION=0.33334,URI="filePart272.i.ts"
#EXT-X-PART:DURATION=0.33334,URI="filePart272.j.ts"
#EXT-X-PART:DURATION=0.33334,URI="filePart272.k.ts"
#EXT-X-PART:DURATION=0.33334,URI="filePart272.l.ts"
#EXTINF:4.000008,
fileSequence272.ts
#EXT-X-PART:DURATION=0.33334,URI="filePart273.1.ts",INDEPENDENT=YES
#EXT-X-PART:DURATION=0.33334,URI="filePart273.2.ts"
#EXT-X-PART:DURATION=0.33334,URI="filePart273.3.ts"
#EXT-X-RENDITION-REPORT:URI="../1M/waitForMSN.php",LAST-MSN=273,LAST-
PART=20
#EXT-X-RENDITION-REPORT:URI="../4M/waitForMSN.php",LAST-MSN=273,LAST-
PART=19
```

Figure 17:
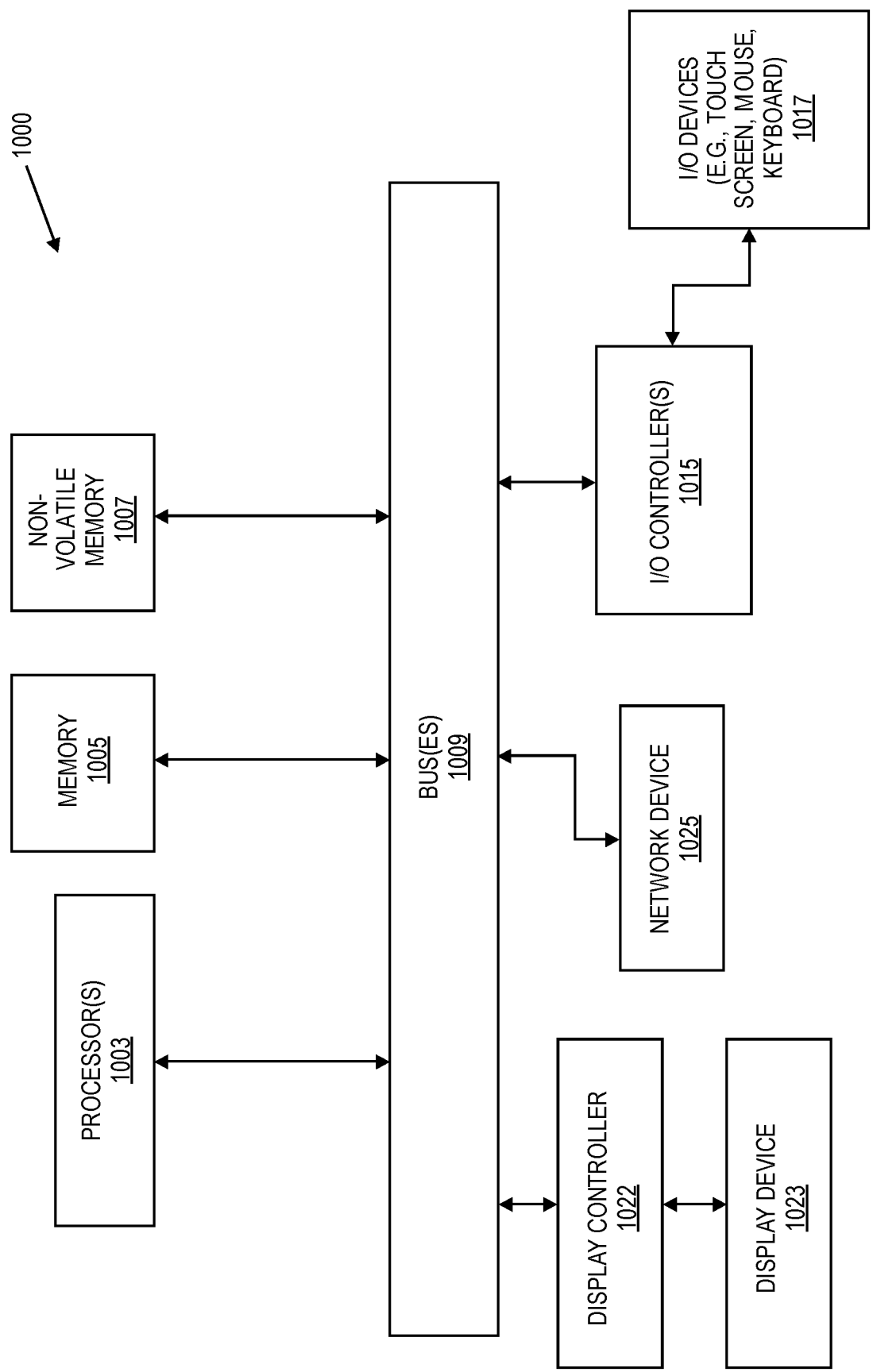
FIG. 17 shows an example of a data processing system which can be used either as a client device or a server device in the various aspects described herein.

FIG. 17 is a block diagram of a data processing system 1000 according to an embodiment. Note that while FIG. 17 illustrates the various components of a data processing system that may be incorporated into a mobile or handheld device or a server system, it is not intended to represent any particular architecture or manner of interconnecting the components as such details are not germane to the present invention. It will also be appreciated that other types of data processing systems that have fewer components than shown or more components than shown can also be used within the various embodiments.

The data processing system 1000 includes one or more bus(es) 1009 that serve to interconnect the various components of the system. One or more processor(s) 1003 are coupled to the one or more bus(es) 1009 as is known in the art. Memory 1005 may be volatile DRAM or non-volatile RAM, such as NOR flash memory or other types of high-speed, non-volatile, execute-in-place memory. This memory can be coupled to the one or more bus(es) 1009 using techniques known in the art. The data processing system 1000 can also include explicitly non-volatile memory 1007, such as data storage devices including one or more hard disk drives, flash memory devices or other types of memory systems that maintain data after power is removed from the system. The non-volatile memory 1007 and the memory 1005 can each couple to the one or more bus(es) 1009 using known interfaces and connection techniques. A display controller 1022 can couple to the one or more bus(es) 1009 to receive display data, which can be displayed on a display device 1023. In one embodiment the display device 1023 includes an integrated touch input to provide a touch screen.

The data processing system 1000 can also include one or more input/output (I/O) controllers 1015 which provide interfaces for one or more I/O devices, such as one or more mice, touch screens, touch pads, and other input devices including those known in the art and output devices (e.g. speakers). The input/output devices 1017 are coupled through one or more I/O controllers 1015 as is known in the art.

While the data processing system 1000 illustrates the memory 1005 and non-volatile memory 1007 as coupled to the one or more buses directly, in one embodiment the non-volatile memory 1007 can be remote from the data processing system 1000, such as in a network storage device which is coupled to the data processing system through a network interface such as a modem, wireless LAN, or Ethernet interface. The bus(es) 1009 can be connected to each other through various bridges, controllers and/or adapters as is well known in the art. In one embodiment the I/O controller 1015 includes one or more of a USB (Universal Serial Bus) adapter for controlling USB peripherals or a Thunderbolt controller for controlling Thunderbolt peripherals. In one embodiment, one or more network device(s) 1025 can be coupled to the bus(es) 1009. The network device(s) 1025 can be wired network devices (e.g., Ethernet) or wireless network devices (e.g., WI-FI, Bluetooth, cellular telephone, etc.).

It will be apparent from this description that embodiments and aspects of the present invention may be embodied, at least in part, in software. That is, the techniques and methods may be carried out in a data processing system or set of data processing systems in response to the processors executing a sequence of instructions stored in a storage medium, such as a non-transitory machine readable storage media, such as volatile DRAM or nonvolatile flash memory. In various embodiments, hardwired circuitry may be used in combination with software instructions to implement the embodiments described herein. Thus the techniques and methods are not limited to any specific combination of hardware circuitry and software, or to any particular source for the instructions executed by the one or more data processing systems.

The following embodiments or aspects are numbered embodiments or aspects that pertain to this disclosure, and these numbered embodiments were presented as claims in the prior U.S. provisional patent applications referred to in the first paragraph of this disclosure.

Embodiment 1

A non-transitory machine readable medium storing executable program instructions which when executed by a data processing system cause the data processing system to perform a method comprising:

receiving a first playlist in a transfer protocol compliant manner, the first playlist comprising a plurality of uniform resource identifiers (URIs), the plurality of URIs indicating an order of playback of multiple media segments that can be received, in the transfer protocol compliant manner, to recreate a stream of data, the first playlist comprising a last URI in the order that identifies a last available media segment in the first playlist, the last available media segment preceding at least a portion of a future media segment that was not available when the first playlist was created;

transmitting, in a single request according to the transfer protocol, a URI for a request for an updated playlist and a request for at least a portion of the future media segment, the updated playlist comprising a second plurality of URIs for media segments for the stream of data; and receiving, in response to the single request, the updated playlist and the at least a portion of the future media segment that is responsive to the request for the future media segment.

Embodiment 2

The medium as in embodiment 1, wherein the method further comprises: requesting a master playlist that comprises a plurality of available media playlists; and requesting, from the master playlist, the first playlist which is one of the plurality of available media playlists.

Embodiment 3

The medium as in embodiment 1, wherein the method further comprises:

upon receipt of the updated playlist, determining a URI in the updated playlist for a last available media segment identified in the updated playlist; and requesting, in a single HTTP compliant request prior to requesting all of the media segments identified in the updated playlist: (1) a further updated playlist that identifies a second media segment following the last media segment identified by the updated playlist and (2) the second media segment.

Embodiment 4

The medium as in embodiment 3 wherein the requesting of the further updated playlist and second the media segment occurs as a high priority process that is quickly scheduled in response to receipt of the updated playlist in order to quickly tune-in to a live event.

Embodiment 5

The medium as in embodiment 1 wherein a URI that identifies the future media segment specifies a starting position within the future media segment that did not exist when the first playlist was created, and wherein the starting position is between the beginning and the end of the future media segment.

Embodiment 6

The medium as in embodiment 3 wherein during a tune-in phase for acquiring a live streaming content provided by the stream of data for a live event; repeatedly skipping to each of a next URI in a next playlist in a series of updated playlists to seek to a latest playback time in the live streaming content and wherein successive playlist updates through the series are rapidly requested in order to differentiate between older playlist updates that are cached in a CDN or origin server and a near live point updated playlist that is in a process of being completed at the origin server and wherein the live event is an event that is happening at the same time that a user of the data processing system is watching the event after the tune-in phase.

Embodiment 7

The medium as in embodiment 2 wherein at least one of the master playlist or the first playlist specifies that one or more origin servers for the stream of data can support requests for further media segments to provide a low latency streaming service for live events.

Embodiment 8

The medium as in embodiment 3 wherein the multiple media segments identified by URIs in the first playlist are each less than about 5 to 10 seconds in length and the multiple media segments identified by the second plurality of URIs are each less than about 5 to 10 seconds, and wherein the future media segment is pushed, from a server, to the data processing system which is a client device.

Embodiment 9

The medium as in embodiment 5 wherein the last URI in the first playlist comprises a first tag for a media sequence number and a second tag for a part number specifying a starting position within the media segment identified by the last URI.

Embodiment 10

The medium as in embodiment 3 wherein a socket connection is maintained in an open state after requesting the updated playlist so that the updated playlist and the at least a portion of the future media segment are received through the socket connection and wherein the method further comprises: requesting a rendition report.

Embodiment 11

A non-transitory machine readable medium storing executable program instructions which when executed by a data processing system cause the data processing system to perform a method comprising:
receiving a first request for an updated playlist identified by a first uniform resource identifier (URI) and a request for at least a portion of a first media segment in the updated playlist, the first request received as a single transfer protocol compliant request that requests both of the updated playlist and the at least a portion of the first media segment;
determining, in response to receiving the first request, that the updated playlist is not yet available;
blocking a completion of a response to the first request for the updated playlist while the updated playlist is not yet available; and
transmitting, in response to the first request, the updated playlist and at least a portion of the first media segment once the updated playlist becomes available.

Embodiment 12

The medium as in embodiment 11 wherein the first media segment is the first media segment in an order of media segments in the updated playlist that identify multiple media segments and the order specifies an order of playback of the multiple media segments that are retrievable using the updated playlist.

Embodiment 13

The medium as in embodiment 12 wherein a socket connection, established by the first request is kept open while the completion of the response is blocked and while the updated playlist and the at least a portion of the first media segment is transmitted.

Embodiment 14

The medium as in embodiment 11 wherein the updated playlist and the at least a portion of the first media segment are transmitted as part of a single response to the first request.

Embodiment 15

The medium as in embodiment 11 wherein the method further comprises:
receiving a request for a master playlist and transmitting the master playlist;
receiving a request for a media playlist selected from a set of media playlists identified in the master playlist, wherein the selected media playlist is at least partially processed by a remote client device before the first request for an updated playlist is received.

Embodiment 16

The medium as in embodiment 11 wherein the data processing system is a set of one or more origin servers that receive streaming content identified in the updated playlist and complete the creating of the updated playlist to thereby make the updated playlist available for transmission to one or more client devices after receiving the first request.

Embodiment 17

The medium as in embodiment 11 wherein the method further comprises: receiving, in the first request, a push tag that specifies a number of media segments or portions of one or more media segments, to be transmitted as part of the response to the first request, wherein the pushing of the number of media segments allow a client device that sent the first request to avoid transmitting requests for the number of media segments.

Embodiment 18

The method of embodiment 15 wherein at least one of the master playlist or the media playlist specifies that the data processing system can support requests for future media segments to provide a low latency streaming service.

Embodiment 19

The method of embodiment 11 wherein the first URI comprises a first tag for a media sequence number and a second tag for a part number specifying a position within the media segment identified by the media sequence number.

Embodiment 20

A non-transitory machine readable medium storing executable program instructions which when executed by a data processing system cause the data processing system to perform a method comprising:
transmitting a first request for a media playlist, the media playlist comprising a plurality of uniform resource identifiers (URIs) that indicate an order of playback of multiple media segments in a transfer protocol compliant manner to recreate a stream of data;
receiving, in response to the first request, the media playlist and selecting two consecutive media segments specified by two URIs in the received media playlist;
transmitting a second request, as one or more transfer protocol compliant requests, for the two consecutive media segments, and the second request specifying a download dependency between the two consecutive media segments, the download dependency specifying that a second download response for the second of the two consecutive media segments should be scheduled after the first download response for the first of the two consecutive media segments;
receiving, in response to the second request, a first media segment of the two consecutive media segments;
determining if a download of the first media segment has been completed; and
transmitting, in response to determining the download of the first media segment has been completed, a third request for a next media segment that immediately follows a second media segment of the two consecutive media segments, the third request occurring while the second media segment is being downloaded and specifying that a third download response for the third request be scheduled after the second download response.

Embodiment 21

The medium as in embodiment 20 wherein the transfer protocol is a hypertext transfer protocol/2 (HTTP/2 protocol).

Embodiment 22

The medium as in embodiment 21 wherein the second request specifies the download dependency using the HTTP/2 protocol so that the first media segment is completely downloaded before beginning to download the second media segment and wherein the method further comprises: requesting a rendition report.

Embodiment 23

The medium as in embodiment 20 wherein the media playlist is selected from a requested and received master playlist that specifies a set of renditions of the stream of data.

Embodiment 24

The medium as in embodiment 20 wherein the media playlist is an updated playlist and the stream of data is for a live event and wherein the receiving, in response to the first request, also comprises receiving a future media segment that is specified by a first URI in the order of playback of multiple media segments in the updated playlist.

Embodiment 25

The medium as in embodiment 24 wherein the data processing system requests, in the first request that is a single HTTP request, both of the media playlist and the future media segment in the single HTTP/2 request.

Embodiment 26

The medium as in embodiment 20 wherein the method further comprises:
determining whether to cease sending a request for a subsequent media segment while a prior media segment is downloading.

Embodiment 27

The medium as in embodiment 26 wherein the data processing system determines to cease sending the request for the subsequent media segment based on how many media segments exist in an updated playlist before a near-live media segment having a low latency, relative to a live event.

Embodiment 28

The medium as in embodiment 27 wherein the low latency is based on a threshold value.

Embodiment 29

The medium as in embodiment 20 wherein the data processing system is configured to attempt to achieve a low latency of presentation of the stream of data relative to a live event.

Embodiment 30

A non-transitory machine readable medium storing executable program instructions which when executed by a data processing system cause the data processing system to perform a method comprising:
measuring a round trip time of a connection between the data processing system and a server system, the connection used as part of an HTTP compliant transmission of streaming media to the data processing system;
determining a send window size; and
transmitting data about the send window size to the server system.

Embodiment 31

The medium as in embodiment 30 wherein the data about the send window size is used to throttle throughput while maintaining sufficient throughput to present a current rendition of the streaming media and wherein the send window size is determined based on a multiplication of measured round trip time and a minimum required bit rate.

Embodiment 32

The medium as in embodiment 31 wherein the method further comprises:
determining a minimum bit rate for supporting playback of the current rendition of the streaming media.

Embodiment 33

The medium as in embodiment 32, wherein the minimum bit rate is selected to avoid stalling of playback of the current rendition.

Embodiment 34

The medium as in embodiment 32 wherein the send window size is determined so that the connection can sustain the minimum bit rate for the measured round trip time.

Embodiment 35

The medium as in embodiment 34 wherein the method further comprises:
monitoring the round trip time (RTT) for the connection to detect a persistent change in RTT over a threshold value for a period of time.

Embodiment 36

The medium as in embodiment 35 wherein when the RTT persistently changes over the threshold value, the data processing system determines a new send window size and transmits new data about the new send window size.

Embodiment 37

The medium as in embodiment 35 wherein requests for updated playlists and requests for media segments identified by uniform resource identifiers (URIs) in the updated playlists are transmitted from the data processing system through the connection and the media segments are received by the data processing system through the connection.

Embodiment 38

The medium as in embodiment 37 wherein a request for an updated playlist also includes, as part of a single HTTP compliant request, a request for a first media segment in the updated playlist.

Embodiment 39

The medium as in embodiment 38 wherein the data processing system attempts to reduce latency to a low latency for a live event that is presented in the streaming media such that a difference in time between an action in the live event and a presentation of the action in the streaming media is less than about 3 to 6 seconds.

Embodiment 40

The medium as in embodiment 30 wherein the round trip time is measured by examining timing data for packets used to open a TCP connection or by using timing data for HTTP/2 ping frames to measure RTT.

Embodiment 41

A non-transitory machine readable medium storing executable program instructions which when executed by a data processing system cause the data processing system to perform a method:
  receiving data about a send window size for use in sending streaming media to a client device which had determined the send window size based on a calculated bandwidth delay product after the client device measured a round trip time for a connection for the streaming media between the client device and the data processing server; and
  throttling an HTTP compliant transmission of the streaming media based on the send window size.

Embodiment 42

The medium as in embodiment 41 wherein the client device determines the send window size so that the connection can sustain a minimum bit rate required for a current rendition of the streaming media that the client device is presenting.

Embodiment 43

The medium as in embodiment 42 wherein the minimum bit rate is selected to avoid stalling of playback of the current rendition.

Embodiment 44

The medium as in embodiment 42 wherein the method further comprises:
  receiving, through the connection, requests for updated playlists and receiving, through the connection, requests for media segments identified by uniform resource identifiers (URIs) in the updated playlists;
  transmitting, through the connection, the updated playlists;
  transmitting, through the connection, the media segments.

Embodiment 45

The medium as in embodiment 44 wherein a request for an updated playlist also includes, as part of a single HTTP compliant request, a request for a first media segment in the updated playlist.

Embodiment 46

The medium as in embodiment 45 wherein the data processing attempts to throttle transmissions to the client device to limit buffer congestion in the connection while also attempting to reduce latency to a low latency for a live event that is presented in the streaming media on the client device such that a difference in time between an action in the live event and a presentation of the action in the streaming media on the client device is less than about 6 seconds.

Embodiment 47

A non-transitory machine readable medium storing executable program instructions which when executed by a data processing system cause the data processing system to perform a method comprising:
  monitoring a bandwidth of a connection used for receiving a first rendition of a streaming media provided through an HTTP compliant protocol;
  determining whether to switch to a second rendition of the streaming media based on the monitored bandwidth;
  requesting a first playlist for the second rendition in response to determining to switch to the second rendition;
  requesting, after requesting the first playlist, a first plurality of media segments of the first rendition; and
  requesting a second plurality of media segments of the second rendition.

Embodiment 48

The medium as in embodiment 47 wherein the requesting of the first plurality of media segments specifies a first weight for a relative download priority for the first plurality of media segments and wherein the requesting of the second plurality of media segments specifies a second weight for a relative download priority for the second plurality of media segments, and wherein the first weight and the second weight are different.

Embodiment 49

The medium as in embodiment 48 wherein the first weight is greater than the second weight when the first rendition has a lower bit rate than the second rendition such that downloading favors the first rendition over the second rendition.

Embodiment 50

The medium as in embodiment 49 wherein the method further comprises:
  ceasing requests for media segments of the first rendition once playback of the second rendition has been established;
  wherein the second weight is greater than the first weight when the second rendition has a lower bit rate than the first rendition, such that downloading favors the second rendition over the first rendition, and more media segments of the second rendition are downloaded, over a period of time, than media segments of the first rendition.

Embodiment 51

The medium as in embodiment 50, wherein the method further comprises:
requesting a set of one or more rendition reports about one or more corresponding renditions, and each rendition report in the set of rendition reports providing data about a recent updated playlist for a corresponding rendition to facilitate a quick tune in to a near live point in the corresponding rendition, and the set of rendition reports comprising one or more of (1) a rendition report for a lower bit rate rendition that has a lower bit rate than the first rendition and (2) a rendition report for a higher bit rate rendition that has a higher bit rate than the first rendition.

Embodiment 52

The medium as in embodiment 51 wherein the recent updated playlist comprises a plurality of uniform resource identifiers (URIs) and a last URI in the plurality of URIs is a near live point relative to a live event that the data processing system can skip to facilitate the quick tune in, and wherein a skip to avoids downloading media segments before the last URI.

Embodiment 53

The medium as in embodiment 47 wherein requests for updated playlists and requests for media segments identified by uniform resource identifiers (URIs) in updated playlists are transmitted from the data processing system through a connection and the media segments are received by the data processing system through the connection, and wherein a request for an updated playlist also includes, as part of a single HTTP compliant request, a request for a first media segment in the updated playlist.

Embodiment 54

The medium as in embodiment 53 wherein the data processing system attempts to reduce latency to a low latency for a live event that is presented in the streaming media such that a difference in time between an action in the live event and a presentation of the action in the streaming media on the data processing system is less than about 3 to 6 seconds.

Embodiment 55

The medium as in embodiment 54 wherein the bandwidth is monitored by examining timing data for packets used to open a TCP connection or by using an HTTP/2 ping frame to measure RTT.

Embodiment 56

The medium as in embodiment 47 wherein the method further comprises:
examining playlist annotations that specify whether a media segment includes an independent frame that can be completely decoded without using any prior frames;
skipping a download of one or more media segments, in the second rendition, that do not include an independent frame based on the playlist annotations;
beginning downloads of media segments in the second rendition with a media segment that includes an independent frame.

Embodiment 57

The medium as in embodiment 47 wherein during a tune-in phase for acquiring live streaming content provided by the streaming media, repeatedly requesting updated playlists until it is determined that a playlist update represents a near live point rather than an old update that has been cached by a delivery system.

Embodiment 58

A non-transitory machine readable medium storing executable program instructions which when executed by a data processing system cause the data processing system to perform a method comprising:
monitoring a bandwidth of a connection used for receiving a first rendition of a streaming media provided through an HTTP compliant protocol;
determining whether to switch to a second rendition of the streaming media based on the monitored bandwidth;
requesting a set of one or more rendition reports about one or more corresponding renditions, wherein each rendition report in the set of one or more rendition reports provides data about a recent updated playlist for a corresponding rendition to facilitate a quick tune-in to a near live point in the corresponding rendition, and the set of one or more rendition reports comprising one or more of (1) a rendition report for a lower bit rate rendition that has a lower bit rate than the first rendition (2) a rendition report for a higher bit rate rendition that has a higher bit rate than the first rendition or a combination thereof; and
requesting a first playlist for the second rendition in response to determining to switch to the second rendition.

Embodiment 59

The medium as in embodiment 58 wherein the recent updated playlist comprises a plurality of uniform resource identifiers (URIs) and wherein a last URI in the plurality of URIs is a near live point relative to a live event that the data processing system can skip to facilitate the quick tune-in, and wherein a skip to the last URI avoids downloading media segments before the last URI.

Embodiment 60

The medium as in embodiment 59 wherein requests for updated playlists and requests for media segments identified by URIs in updated playlists are transmitted from the data processing system through a connection, and wherein a request for an updated playlist also includes, as part of a single HTTP compliant request, a request for a first media segment in the updated playlist.

Embodiment 61

The medium as in embodiment 60 wherein the data processing system attempts to reduce latency to a low latency for a live event that is presented in the streaming media such that a difference in time between an action in the live event and a presentation of the action in the streaming media on the data processing system is less than about 3 to 6 seconds.

Embodiment 62

The medium as in embodiment 58 wherein the first playlist is requested in a single HTTP compliant request that also requests a media segment in the second rendition based on data about the second rendition in a received rendition report that was requested and received.

Embodiment 63

A non-transitory machine readable medium storing executable program instructions which when executed by a data processing system cause the data processing system to perform a method comprising:
monitoring a bandwidth of a connection used for receiving a first rendition of a streaming media provided through an HTTP compliant protocol;
determining whether to switch to a second rendition of the streaming media based on the monitored bandwidth;
requesting a first playlist for the second rendition in response to determining to switch to the second rendition;
examining, in the first playlist, one or more playlist annotations that specify whether a media segment includes an independent frame that can be decoded into a full image frame without using any prior frames;
skipping a download of one or more media segments, in the first playlist, that do not include an independent frame based on the one or more playlist annotations; and
beginning downloads of media segments in the second rendition with a media segment that includes an independent frame based on the one or more playlist annotations.

Embodiment 64

The medium as in embodiment 63 wherein the first playlist includes dependent frames that cannot be decoded into valid data without a prior independent frame.

Embodiment 65

The medium as in embodiment 64 wherein an independent frame is a key frame that contains all necessary data to derive and decode an encoded image in the key frame, and dependent frames that follow in time the independent frame use data in the key frame to decode encoded images in the dependent frames.

Embodiment 66

The medium as in embodiment 65 wherein dependent frames include P and B frames that include difference data relative to an independent frame on which they depend.

Embodiment 67

The medium as in embodiment 65 wherein the method further comprises;
requesting a set of one or more rendition reports about one or more corresponding renditions, wherein each rendition report in the set of one or more rendition reports provides data about a recent updated playlist for a corresponding rendition to facilitate a quick tune-in to a near live point in the corresponding rendition, and the set of one or more rendition reports comprise one or more of: (1) a rendition report for a lower bit rate rendition that has a lower bit rate than the first rendition and (2) a rendition report for a higher bit rate rendition that has a higher bit rate than the first rendition.

Embodiment 68

The medium as in embodiment 67 wherein the media segment which begins the downloads of the second rendition is the last media segment containing an independent frame but is not the last media segment in the first playlist.

Embodiment 69

A set of one or more server systems that provide updated playlists that include playlist annotations as in embodiments 63-68 in response to HTTP compliant requests for the updated playlists.

Embodiment 70

A set of one or more server systems that provide one or more rendition reports as in embodiments 58-62.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What is claimed is:
1. A non-transitory machine readable medium storing executable program instructions which when executed by a data processing system cause the data processing system to perform a method comprising:
receiving, at a client device from one or more server devices, a tag that indicates the one or more server devices support blocking reload;
monitoring a bandwidth of a connection used for receiving a first rendition of a streaming media provided through an HTTP compliant protocol;
determining whether to switch to a second rendition of the streaming media based on the monitored bandwidth;
requesting a first playlist for the second rendition in response to determining to switch to the second rendition;
examining, in the first playlist, one or more playlist annotations that specify whether a media segment includes one or more independent frames that can be decoded into a full image frame without using any prior frames;
skipping, prior to beginning downloads of media segments of the second rendition, a download of one or more of the media segments in the first playlist, that do not include one or more independent frames based on the one or more playlist annotations that indicate whether a respective one of the media segments includes the one or more independent frames; and
beginning downloads of the media segments in the second rendition with a first media segment that includes the one or more independent frames based on the one or more playlist annotations; and while performing a quick tune-in to a near live point, skipping, based on one or more rendition reports, to a last media segment in the first playlist that contains the one or more independent frames wherein the last media segment in the first playlist that contains the one or more independent frames is followed by one or more additional media segments in the first playlist that do not contain the one or more independent frames, without downloading skipped media segments.

2. The medium as in claim 1 wherein the first playlist includes one or more dependent frames that cannot be decoded into valid data without a prior independent frame, and wherein the tag is received, by the client device, in a master playlist, the master playlist being received prior to the client device receiving the first playlist.

3. The medium as in claim 2 wherein the prior independent frame is a key frame that contains all necessary data to derive and decode an encoded image in the key frame, and dependent frames that follow in time the prior independent frame use data in the key frame to decode encoded images in the dependent frames.

4. The medium as in claim 3 wherein the dependent frames include P and B frames that include difference data relative to the prior independent frame on which they depend.

5. The medium as in claim 1 wherein the method further comprises:

requesting a set of the one or more rendition reports about one or more corresponding renditions, wherein each rendition report in the set of one or more rendition reports provides data about a recent updated playlist for a corresponding rendition to facilitate the quick tune-in to the near live point in the corresponding rendition, and the set of one or more rendition reports comprise one or more of: (1) a rendition report for a lower bit rate rendition that has a lower bit rate than the first rendition, or (2) a rendition report for a higher bit rate rendition that has a higher bit rate than the first rendition.

6. The medium as in claim 5 wherein the first media segment which begins the downloads of the second rendition is the last media segment containing the one or more independent frames in the first playlist.

7. The medium as in claim 1, wherein the method further comprises:

requesting a next playlist for the second rendition when the next playlist is not available to cause a server device to block a response to the request for the next playlist until it is available.

8. A machine implemented method performed by a data processing system, the method comprising:

receiving, at a client device from one or more server devices, a tag that indicates the one or more server devices support blocking reload;

monitoring a bandwidth of a connection used for receiving a first rendition of a streaming media provided through an HTTP compliant protocol;

determining whether to switch to a second rendition of the streaming media based on the monitored bandwidth;

requesting a first playlist for the second rendition in response to determining to switch to the second rendition;

examining, in the first playlist, one or more playlist annotations that specify whether a media segment includes one or more independent frames that can be decoded into a full image frame without using any prior frames;

skipping, prior to beginning downloads of media segments of the second rendition, a download of one or more of the media segments, in the first playlist, that do not include any independent frames based on the one or more playlist annotations that indicate whether a respective one of the media segments includes the one or more independent frames; and beginning downloads of the media segments in the second rendition with a first media segment that includes an independent frame based on the one or more playlist annotations; and while performing a quick tune-in to a near live point, skipping, based on one or more rendition reports, to a last media segment in the first playlist that contains the one or more independent frames wherein the last media segment in the first playlist that contains the one or more independent frames is followed by one or more additional media segments in the first playlist that do not contain the one or more independent frames, without downloading skipped media segments.

9. The method as in claim 8 wherein the first playlist includes one or more dependent frames that cannot be decoded into valid data without a prior independent frame, and wherein the tag is received, by the client device, in a master playlist, the master playlist being received prior to the client device receiving the first playlist.

10. The method as in claim 9 wherein the prior independent frame is a key frame that contains all necessary data to derive and decode an encoded image in the key frame, and dependent frames that follow in time the prior independent frame use data in the key frame to decode encoded images in the dependent frames.

11. The method as in claim 10 wherein the dependent frames include P and B frames that include difference data relative to the prior independent frame on which they depend.

12. The method as in claim 10 wherein the method further comprises:

requesting a set of the one or more rendition reports about one or more corresponding renditions, wherein each rendition report in the set of one or more rendition reports provides data about a recent updated playlist for a corresponding rendition to facilitate the quick tune-in to the near live point in the corresponding rendition, and the set of one or more rendition reports comprise one or more of: (1) a rendition report for a lower bit rate rendition that has a lower bit rate than the first rendition, or (2) a rendition report for a higher bit rate rendition that has a higher bit rate than the first rendition.

13. The method as in claim 12 wherein the first media segment which begins the downloads of the second rendition is the last media segment containing the one or more independent frames in the first playlist.

14. A non-transitory machine readable medium storing executable program instructions which when executed by one or more server devices cause the one or more server devices to perform a method, the method comprising:

transmitting, to one or more client devices, a tag that indicates the one or more server devices support blocking reload;

generating a plurality of updated playlists, including a first playlist, for a plurality of renditions of a streaming media content provided through an HTTP compliant protocol, each of the plurality of updated playlists including a set of one or more playlist annotations that specify whether a respective one of the media segments includes one or more independent frames that can be decoded into a full image frame without using any prior frames, the set of one or more playlist annotations allowing one or more client devices to skip downloading of dependent frames when switching between renditions of the streaming media content based on the one or more playlist annotations that indicate whether the respective one of the media segments includes the one or more independent frames;

transmitting the plurality of updated playlists in response to one or more requests for the updated playlists in the plurality of updated playlists; and transmitting one or more rendition reports to the one or more client devices, wherein the one or more client devices is configured to perform a quick tune-in to a near live point, comprising skipping, based on the one or more rendition reports, to a last media segment in the first playlist of the updated playlists that contains the one or more independent frames wherein the last media segment in the first playlist that contains the one or more independent frames is followed by one or more additional media segments in the first playlist that do not contain the one or more independent frames, without downloading skipped media segments.

15. The medium as in claim 14 wherein the one or more requests are from either one or more caching servers or the one or more client devices, and wherein the tag is transmitted in a master playlist.

16. The medium as in claim 14 wherein each of the plurality of updated playlists includes one or more dependent frames that cannot be decoded into valid data without a prior independent frame.

17. The medium as in claim 16 wherein the prior independent frame is a key frame that contains all necessary data to derive and decode an encoded image in the key frame, and dependent frames that follow in time the prior independent frame use data in the key frame to decode encoded images in the dependent frames.

18. The medium as in claim 17 wherein the dependent frames include P and B frames that include difference data relative to the prior independent frame on which they depend.

19. The medium as in claim 14 wherein the method further comprises:

requesting a set of the one or more rendition reports about one or more corresponding renditions, wherein each rendition report in the set of one or more rendition reports provides data about a recent updated playlist for a corresponding rendition to facilitate the quick tune-in to the near live point in the corresponding rendition, and the set of one or more rendition reports comprise one or more of: (1) a rendition report for a lower bit rate rendition that has a lower bit rate than the first rendition, or (2) a rendition report for a higher bit rate rendition that has a higher bit rate than the first rendition.

20. The medium as in claim 19 wherein the media segment which begins the downloads of a new rendition is the last media segment containing the one or more independent frames in the first updated playlist.

21. The medium as in claim 14, wherein the method further comprises:

receiving a request for a next playlist;

blocking a completion of a response to the request for the next playlist while the next playlist is not yet available.

* * * * *